(12) United States Patent
Sosinov et al.

(10) Patent No.: US 10,399,461 B1
(45) Date of Patent: Sep. 3, 2019

(54) METHODS FOR ELECTRIC POWER

(71) Applicant: FreeWire Technologies, Inc., San Leandro, CA (US)

(72) Inventors: Arcady Sosinov, San Francisco, CA (US); Sanat Kamal Bahl, San Jose, CA (US); Love Kothari, Sunnyvale, CA (US); Sameer Mehdiratta, Cupertino, CA (US)

(73) Assignee: FreeWire Technologies, Inc., San Leandro, CA (US)

( * ) Notice: Subject to any disclaimer, the term of this patent is extended or adjusted under 35 U.S.C. 154(b) by 0 days.

(21) Appl. No.: 15/432,664

(22) Filed: Feb. 14, 2017

Related U.S. Application Data

(62) Division of application No. 14/681,415, filed on Apr. 8, 2015, now Pat. No. 9,592,742.

(60) Provisional application No. 61/977,493, filed on Apr. 9, 2014.

(51) Int. Cl.
*B60L 53/35* (2019.01)
*B60L 53/12* (2019.01)
*B60L 53/14* (2019.01)
*G05D 1/02* (2006.01)

(52) U.S. Cl.
CPC ............. *B60L 53/35* (2019.02); *B60L 53/12* (2019.02); *B60L 53/14* (2019.02); *G05D 1/0276* (2013.01)

(58) Field of Classification Search
CPC .............. B60L 11/1827; B60L 11/1816; B60L 11/182; B60L 53/35; B60L 53/12; B60L 53/14; G05D 1/0276
USPC .................................................. 320/108, 109
See application file for complete search history.

(56) References Cited

U.S. PATENT DOCUMENTS

| | | | | |
|---|---|---|---|---|
| 8,299,754 | B2* | 10/2012 | Hayashigawa | B60L 3/0069 320/109 |
| 8,829,851 | B2* | 9/2014 | Prosser | B60L 11/1844 320/109 |
| 9,469,203 | B2* | 10/2016 | Momose | B60L 11/1809 |
| 2012/0005031 | A1* | 1/2012 | Jammer | B60L 11/1816 705/16 |
| 2012/0013300 | A1* | 1/2012 | Prosser | B60L 11/1844 320/109 |
| 2013/0054457 | A1* | 2/2013 | Strickland | G07F 15/005 705/44 |
| 2013/0201316 | A1* | 8/2013 | Binder | H04L 67/12 348/77 |

* cited by examiner

*Primary Examiner* — M Baye Diao
(74) *Attorney, Agent, or Firm* — Williams IPS; Larry Williams

(57) ABSTRACT

One aspect of the present invention pertains to a method of charging electric storage devices such as batteries. Another aspect of the present invention pertains to a system for charging electric storage devices such as batteries. Another aspect of the present invention pertains to a mobile apparatus for charging electric storage devices such as batteries.

13 Claims, 13 Drawing Sheets

METHODS FOR ELECTRIC POWER

CROSS-REFERENCE TO RELATED APPLICATIONS

The present application is a divisional of U.S. patent application Ser. No. 14/681,415, entitled "SYSTEMS, APPARATUS, AND METHODS OF CHARGING ELECTRIC VEHICLES" to Arcady SOSINOV, Sanat KAMAL BAHL, Love KOTHARI, and Sameer MEHDIRATTA, filed Apr. 8, 2015, which claims benefit of U.S. Provisional Patent application Ser. No. 61/977,493, entitled "SYSTEMS, APPARATUS, METHODS OF BATTERY CHARGING USING A MOBILE CHARGER," to Arcady SOSINOV, Sanat KAMAL BAHL, Love KOTHARI, and Sameer MEHDIRATTA, filed Apr. 9, 2014; U.S. patent application Ser. No. 14/681,415, entitled "SYSTEMS, APPARATUS, AND METHODS OF CHARGING ELECTRIC VEHICLES" to Arcady SOSINOV, Sanat KAMAL BAHL, Love KOTHARI, and Sameer MEHDIRATTA, filed Apr. 8, 2015 and U.S. Provisional Patent application Ser. No. 61/977,493, entitled "SYSTEMS, APPARATUS, METHODS OF BATTERY CHARGING USING A MOBILE CHARGER," to Arcady SOSINOV, Sanat KAMAL BAHL, Love KOTHARI, and Sameer MEHDIRATTA, filed Apr. 9, 2014 are incorporated herein in their entirety by this reference for all purposes.

BACKGROUND

The use of electric vehicles for applications such as transportation is expected to grow. A variety of options and technologies exist that may solve one or more expected challenges that may result from the desire to use electric vehicles. The present inventors have developed one or more solutions that may address one or more problems related to charging electric vehicles.

SUMMARY

One aspect of the present invention pertains to an apparatus for charging electric storage devices such as batteries for electric vehicles. Another aspect of the present invention pertains to a system for charging electric storage devices such as batteries for electric vehicles. Another aspect of the present invention pertains to a method of charging electric energy storage devices such as batteries for electric vehicles.

It is to be understood that the invention is not limited in its application to the details of construction and to the arrangements of the components set forth in the following description. The invention is capable of other embodiments and of being practiced and carried out in various ways. In addition, it is to be understood that the phraseology and terminology employed herein are for the purpose of description and should not be regarded as limiting.

Figure 1:
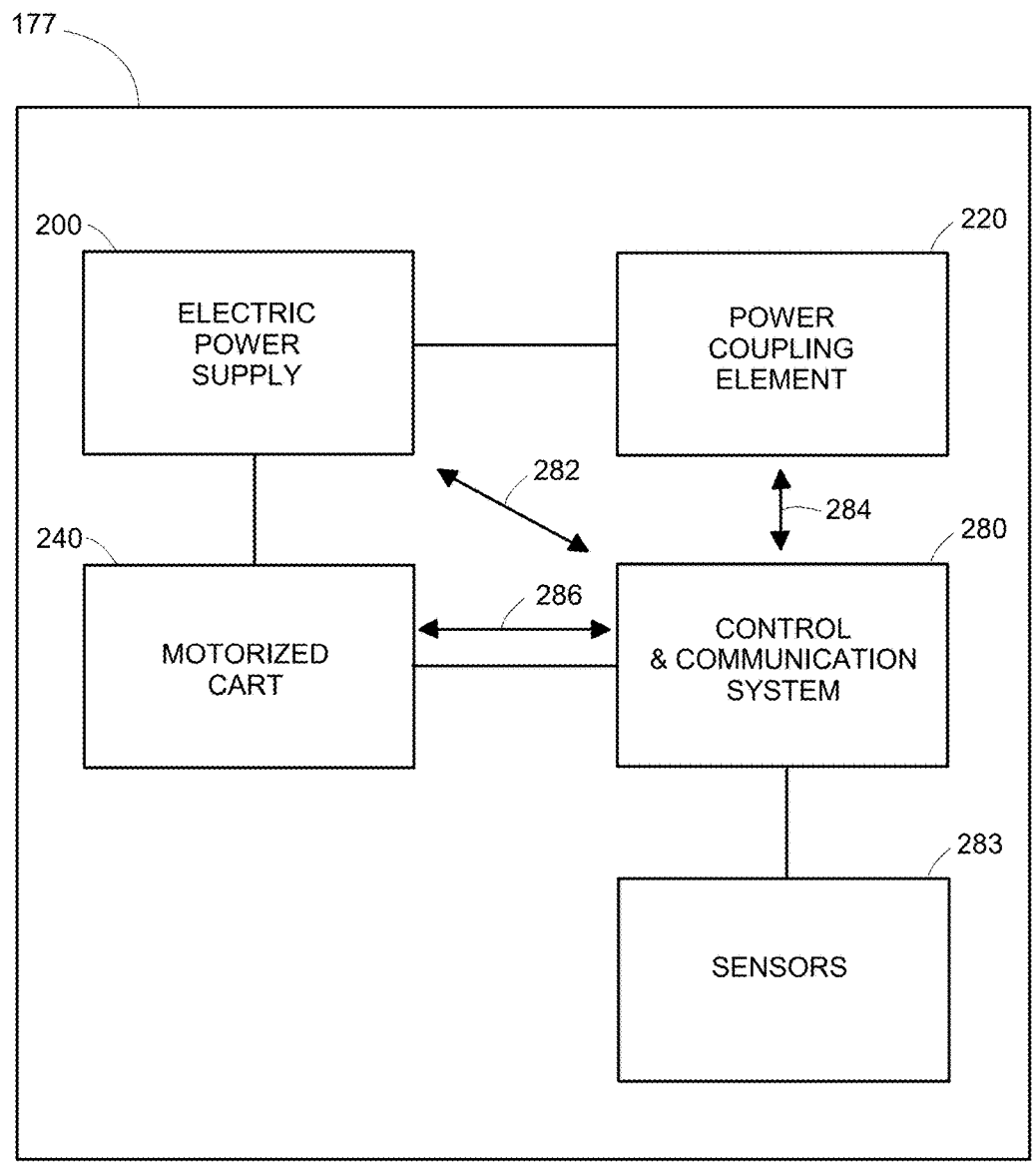
FIG. 1 is a diagram of an electric vehicle charger according to one or more embodiments of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding embodiments of the present invention.

DESCRIPTION

In the following description of the figures, identical reference numerals have been used when designating substantially identical elements or processes that are common to the figures.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

Various embodiments the present invention may include any of the described features, alone or in combination. Other features and/or benefits of this disclosure will be apparent from the following description.

For the following defined terms, these definitions shall be applied, unless a different definition is given in the claims or elsewhere in this specification.

"Autonomous" is defined herein as meaning capable of operating without direct real-time control by a person(s) or operating without direct real-time control by a person(s).

"Drive battery" is defined herein as meaning a battery that provides power for propelling an electric vehicle.

"Electric vehicle" (EV) is defined herein as meaning a vehicle for which at least some of the energy for moving the vehicle is derived from an onboard stored electric power supply such as a battery and/or a capacitor. Examples of electric vehicles include, but are not limited to, a battery electric vehicle, a capacitor electric vehicle, a hybrid electric vehicle, and a plug-in hybrid electric vehicle.

"Mobile" is defined herein as meaning capable of moving and/or being moved and is not fixed to one position or place, but optionally may be attached to a flexible connection such as an electric power line, a fuel line, an information transfer line, or combinations thereof.

"Motorized" is defined herein as meaning capable of self-propulsion such as having a motor, an engine, or other drive mechanism to accomplish locomotion.

"Remote control" is defined herein as meaning operating or being controlled from a distance.

"Wireless" is defined herein as meaning not having a solid physical connection for conveying information, data, signals, and/or energy.

"Wired" is defined herein as meaning having a solid physical connection for conveying information, data, signals, and/or energy.

All numeric values are herein defined as being modified by the term "about," whether or not explicitly indicated. The term "about" generally refers to a range of numbers that a person of ordinary skill in the art would consider equivalent to the stated value to produce substantially the same properties, function, result, etc. A numerical range indicated by a low value and a high value is defined to include all numbers subsumed within the numerical range and all subranges subsumed within the numerical range. As an example, the range 10 to 15 includes, but is not limited to, 10, 10.1, 10.47, 11, 11.75 to 12.2, 12.5, 13 to 13.8, 14, 14.025, and 15.

The order of execution or performance of the operations or the processes in embodiments of the invention illustrated and described herein is not essential, unless otherwise specified. That is, the operations or the processes may be performed in any order, unless otherwise specified, and embodiments of the invention may include additional or fewer operations or processes than those disclosed herein. For example, it is contemplated that executing or performing a particular operation or process before, simultaneously with, contemporaneously with, or after another operation or process is within the scope of aspects of the invention.

As will be understood by a person skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as an "apparatus", a "circuit," a "module" or a "system." Furthermore, aspects of the present invention may take the form of a computer program product embodied in one or more non-transitory computer readable medium(s) having computer readable program code embodied, e.g., stored, thereon.

Any combination of one or more non-transitory computer readable mediums may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java™, Smalltalk, C++ or the like and conventional procedural programming languages, such as the "C" programming language, such as .net framework and Microsoft Corporation programming languages and databases, such as HTML5, Android Mobile applications and Apple Corporation iOS mobile applications, or similar programming languages. The program code may execute entirely on a local computer, partly on the local computer, as a stand-alone software package, partly on the local computer and partly on a remote computer, or entirely on the remote computer or server. In the latter scenario, the remote computer may be connected to the local computer through any type of network, including a local area network (LAN) or a wide area network (WAN), or the connection may be made to an external computer (for example, through the Internet using an Internet Service Provider). The program code may reside on remote servers and software networks such as for cloud computing such as, but not limited to, Amazon Web Services, Google cloud etc. Mobile applications of the program code may also be available for download from services such as Apple App store and Google play.

Aspects of the present invention are described below with reference to flowchart illustrations and/or block diagrams of methods, processes, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions which execute via the processor of the computer, other programmable data processing apparatus, or other devices enable implementation of the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following description is primarily directed towards charging electric vehicles, particularly electric automobiles. It is to be understood that one or more embodiments of the present invention apply to other electric vehicles such as, but not limited to, electric trucks, electric vans, electric buses, electric bikes, and electric motorcycles.

The following documents are incorporated herein in their entirety by this reference for all purposes: European Patent Application 2402205A1, United States Patent Application 2012/0005031, and U.S. Pat. No. 8,473,131.

Reference is now made to FIG. 1 where there is shown a box diagram of a mobile electric vehicle charger 177 according to one embodiment of the present invention. Electric vehicle charger 177 comprises an electric power supply 200 and a power coupling element 220. Power coupling element 220 is connected with electric power supply 200 so as to enable a transfer of electric energy derived from electric power supply 200 to an electric vehicle (not shown). FIG. 1 also shows electric vehicle charger 177 including a motorized cart 240. Electric power supply 200 is mounted on motorized cart 240 so as to enable locomotion of electric power supply 200 and power coupling element 220 such as for moving from a first location to a second location. Electric vehicle charger 177 further includes a control and communication system 280 also supported on and connected with motorized cart 240 so that electric vehicle charger 177 can move from the first location to the second location by remote control and/or commands from control and communication system 280. Electric vehicle charger 177 includes one or more sensors 283 connected with and/or integrated into control and communication system 280.

FIG. 1 indicates information transfer between electric power supply 200 and control and communication system 280 with an arrow 282, indicates information transfer between power coupling element 220 and control and communication system 280 with an arrow 284, and indicates information transfer between motorized cart 240 and control and communication system 280 with an arrow 286. The information transfer may include data from sensors 283 such as to indicate the status of electric power supply 200, the status of motorized cart 240, operating instructions and/or commands, or other information.

Electric power supply 200 may be implemented in one or more embodiments of the present invention in a variety of configurations. According to one embodiment of the present invention, electric power supply 200 comprises an electric energy source such as a battery, a fuel-cell, a capacitor, a connection to an electric power line such as to an electric grid and/or a remote electric power supply, or combinations thereof. In one configuration, the source of the electric energy is stored onboard electric vehicle charger 177 such as storage in the battery, the capacitor, and/or the fuel cell. As an option for embodiments using fuel cells, electric vehicle charger 177 may include a container for fuel so as to store a fuel supply onboard.

According to one embodiment of electric vehicle charger 177 with electric power supply 200 configured as an onboard energy storage system, the energy storage may be accomplished in a modular design. More specifically, one or more batteries and/or one or more capacitors may be used together as part of the energy storage system. The one or more batteries and/or one or more capacitors may be designed so that they are detachable and/or easily replaceable such as by the use of quick connect contacts and/or quick connect fasteners. The modular configuration for the electric power supply enables charging of the batteries and/or capacitors independently of them being attached to electric vehicle charger 177. Instead of taking electric vehicle charger 177 out of operation to recharge depleted batteries and/or capacitors, the depleted batteries and/or capacitors can simply be removed from electric vehicle charger 177 and replaced with recharged batteries and/or capacitors. Electric vehicle charger 177 can then continue to charge electric vehicles while the depleted batteries and/or capacitors are being recharged. This also means that the amount of time that electric vehicle charger 177 is available for performing electric vehicle charging is increased and electrical vehicle charger 177 is used more efficiently.

In another configuration, the source of the electric energy is not stored onboard electric vehicle charger 177. According to one embodiment, electric vehicle charger 177 includes a connection to an electrical power line connected to the electric grid or another remote electric power source. More specifically for this embodiment, electric vehicle charger 177 has electric power supply 200 configured to include one end of an electrical line connected with an electric grid or other remote power source. For this embodiment, electric power supply 200 comprises a hardwired connection to the electric grid and/or the remote power system. In other words, the electric power line is tethered to electric vehicle charger 177 so that electrical energy can be drawn through the electric power line from the electric grid and/or remote power system to accomplish the charging of electric vehicles. Nominally, electric vehicle charger 177 having a connection to the electric power line can charge electrical vehicles within a distance equal to the length of the electrical power line.

In another configuration, the source of the electric energy is not stored on board electric vehicle charger 177, but instead electric vehicle charger 177 includes a fuel cell and a connection to a fuel line connected to a fuel source for the fuel cell for generating electric power.

Another embodiment of the present invention has electric power supply 200 comprising a chemical fuel driven electricity generator other than a fuel cell. In one configuration, the electric power supply 200 comprises a chemical fuel driven electricity generator such as an internal combustion engine driven electricity generator. Optionally, the fuel used for generating the electricity may be derived from a renewable or carbon neutral source.

Embodiments of the present invention may use a variety of types of power coupling element 220. The type of power coupling element 220 selected for electric vehicle charger 177 will depend on the type of coupling required to transfer power to the electric vehicle. Optionally, electric vehicle charger 177 may have more than one type of power coupling element 220 so as to be able to charge more than one type of electric vehicle. According to one embodiment of the present invention, power coupling element 220 comprises a conductive connector to conduct electric power to a drive battery of the electric vehicle.

According to another embodiment of the present invention, power coupling element 220 comprises a coil to inductively provide electric power to charge a drive battery of the electric vehicle. More specifically, inductively provided electric power is enabled by wireless charging which works with a transmitting-receiving coil system that couple to send energy via magnetic induction over a distance via over-the-air transmission. More specifically, there is no physical connection between the transmitting and receiving coil. According to one embodiment, the electric vehicle will have a receiving coil mounted on the bottom or the side of the electric vehicle. Power coupling element 220 may include the transmitting coil. Power coupling element 220 uses the transmitting coil to provide electricity at a suitable frequency for over-the-air wireless electricity transfer to the electric vehicle receiving coil using magnetic induction or magnetic resonance.

According to one embodiment of the present invention, electric vehicle charger 177 is configured so that power coupling element 220 provides an alternating current, which may be at different frequencies or voltage from the electric grid voltage or frequency. According to another embodiment of the present invention, electric vehicle charger 177 is configured so that power coupling element 220 provides a direct current, which may be at different voltage from the electric grid. In other words, one or more embodiments of the present invention include electric vehicle charger 177 configured to provide current at voltages and/or frequencies that can be received by an electric vehicle.

Power coupling element 220 may include substantially any type of conductive connector that the electric vehicle is configured to receive. Conductive connectors, suitable for electric vehicle charging, are commercially available and new types of conductive connectors are being developed. Examples of some types of currently available conductive connectors designed for charging electric vehicles include but is not limited to, J1772 AC connector, CHAdeMO connector, and SAE Combo connector.

Motorized cart 240 has a typical structure of a cart with the addition of a motor, an engine, or other drive system. More specifically, motorized cart 240 may include a housing, a frame, a base, and/or a platform having one or more wheels or treads rotatably coupled thereto. The motor is coupled to the one or more wheels or treads to accomplish locomotion of the cart, i.e. movement from place to place, such as from a first location to a second location. The places or the locations can be within a parking area such as a parking lot, a parking structure, or another type of defined area that receives electric vehicles.

Control and communication system 280 may have a variety of configurations for one or more embodiments of the present invention. According to one embodiment of the present invention, control and communication system 280 comprises a computer, a central processing unit, a microprocessor, an electronic memory, an application specific integrated circuit, a field programmable gate array, an information processor, or combinations thereof. Embodiments of the present invention may also have control and communication system 280 further comprising a transmitter circuit, a receiver circuit, a display, a user interface, a light generator, a sound generator, or combinations thereof. According to one or more embodiments of the present invention, the communication system of control and communication system 280 comprises a global positioning system to provide location information for electric vehicle charger 177. The location information can be used for autonomously controlling movement of electric vehicle charger 177 and/or remote control movement of electric vehicle charger 177.

According to one or more embodiments of the present invention, control and communication system 280 comprises a computer program product for charging electric vehicles. The computer program product is embodied in a non-transitory computer readable medium and comprising computer instructions for controlling the performance of electric vehicle charger 177, controlling the actions of electric vehicle charger 177, controlling the place to place movement of electric vehicle charger 177, controlling reception and transmission of information for electric vehicle charger 177, controlling autonomous operation of electric vehicle 177, and combinations thereof. Optionally, the non-transitory computer readable medium may reside entirely on electric vehicle charger 177 or at a remote location such as a network location, a cloud storage location, a network server, or combinations thereof.

According to one or more embodiments of the present invention, the transmitter circuit and/or receiver circuit are embodied in a transmitter or receiver such as those typically used for electronic device communication systems. Examples of electronic device transmitter systems suitable for one or more embodiments of the present invention include, but are not limited to, dedicated short-range communications (DSRC) (also known as 802.11p), BLUETOOTH®, near-field communications technology (NFC), Wi-Fi, a local area network, cloud software application, or a locally-hosted software application.

According to one or more embodiments of the present invention, the electric vehicle charger 177 further comprise one or more sensors 283 connected with control and communications system 280 and/or included with control and communication system 280. Sensors 283 may perform a variety of functions to provide information for operation of electric vehicle charger 177. According to one embodiment of the present invention, one of the sensors is responsive to the operational state of electric power supply 200 and is disposed so as to provide data to control and communication system 280. According to another embodiment of the present invention, one or more sensors are included which provide data about the surroundings of electric vehicle charger 177; examples of these sensors include, but are not limited to, impediments sensors such as to detect the presence of barriers or other obstructions to the movement of electric vehicle charger 177, sensors for machine vision such as a camera, sensors to detect the location of electric vehicles, sensors to detect the location of electric charging ports or coils on the electric vehicles, sensors to detect foreign objects, sensors to detect any other object electric vehicle charger 177 needs to detect in order to operate autonomously and/or by remote control, sensors to detect human and object obstructions, sensors to detect weather conditions such as relative humidity, rain, temperature, and fog, and combinations thereof.

According to one or more embodiments of the present invention, electric vehicle charger 177 comprises hardware and/or software to accomplish operation of electric vehicle charger 177. Alternative embodiments of electric vehicle charger 177 may be configured for remote control operation by a user. According to one or more embodiments of the present invention, electric vehicle charger 177 comprises hardware and/or software to accomplish machine-learning operations so as to continue to improve the performance of electric vehicle charger 177 based on the data collected from the sensors.

According to one embodiment of the present invention, electric vehicle charger 177 comprises hardware and/or software to direct electric vehicle charger 177 from a first location or place to a second location or place using global positioning satellite coordinates, remote control instructions, a signal from the second location or place, a signal from a wireless network, or combinations thereof. According to still another embodiment of the present invention, the electric vehicle charger 177 comprises hardware and/or software to direct electric vehicle charger 177 to a location proximate the location of a discharged electric vehicle using global positioning satellite coordinates, remote control instructions, a signal from the discharged electric vehicle, a signal from a wireless network, or combinations thereof.

According to one or more embodiments of the present invention, electric vehicle charger 177 comprises one or more electric power supply sensors responsive to the operational state of the electric power supply and connected to the control and communication system to provide data thereto.

Also, controller and communication system 280 comprises hardware components and/or software instructions to direct electric vehicle charger to a base station to recharge in response to a predetermined state of the electric power supply using global positioning satellite coordinates, remote control instructions, a signal from the base station, a signal from a wireless network, or combinations thereof.

Embodiments of the present invention which are enabled for autonomous operation and/or remote control do not require onboard space for a human operator. Consequently, one or more embodiments of the present invention include having electric vehicle charger 177 configured in a compact design. Because of the compact design, one or more embodiments of the present invention can be used to charge electric vehicles in confined spaces such as a parking area. The compact design for one or more embodiments of the present invention can permit using electric vehicle charger 177 without the need to use another parking space and/or without the need to use the driving lane adjacent to the parking space of the electric vehicle being charged. In other words, the compact design for one or more embodiments of the present invention reduces the need for area used by the electric vehicle charger during charger and and/or reduces the obstruction of traffic passing the electric vehicle as it is being charged.

According to another embodiment of the present invention, electric vehicle charger 177 may further comprise one or more photovoltaic cells (photovoltaic cells not shown in FIG. 1) disposed so as to receive light, such as on the exterior of electric vehicle charger 177, so that the light can be converted into electricity. Optionally, the electricity generated by the photovoltaic cells can be used to power the control and communication system and/or other components of electric vehicle charger 177 which low voltage power.

Figure 2:
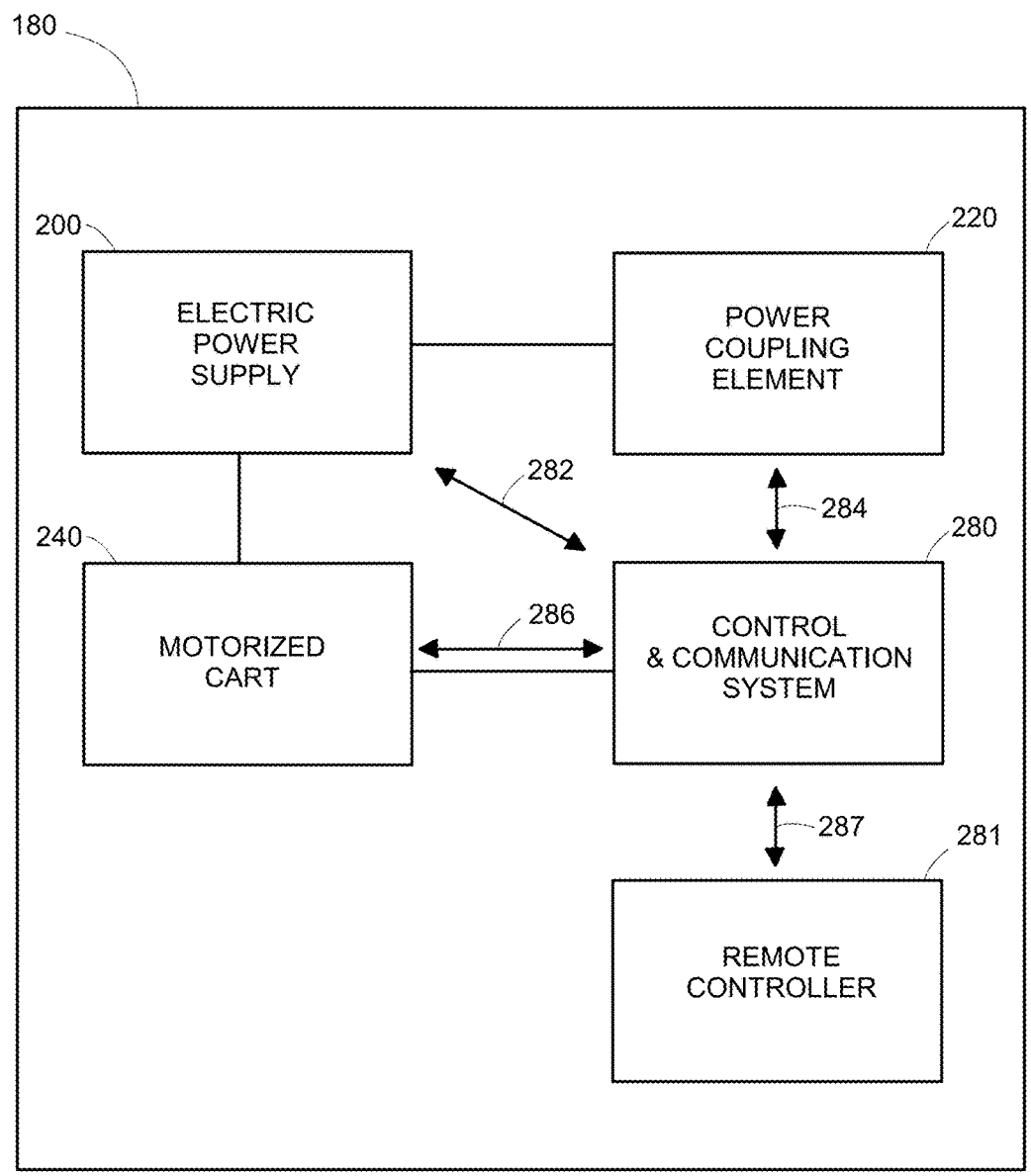
FIG. 2 is a diagram of an electric vehicle charger according to one or more embodiments of the present invention.

Reference is now made to FIG. 2 where there is shown a box diagram of a mobile electric vehicle charger 180 according to one embodiment of the present invention. Electric vehicle charger 180 is essentially the same as electric vehicle charger 180 described above for FIG. 1 with the exception of further comprising a remote controller 281. More specifically, electric vehicle charger 180 comprises an electric power supply 200 and a power coupling element 220. Power coupling element 220 is connected with electric power supply 200 so as to enable transfer electric energy derived from electric power supply 200 to an electric vehicle (not shown). FIG. 2 also shows electric vehicle charger 180 including a motorized cart 240. Electric power supply 200 is mounted on motorized cart 240 so as to enable locomotion of electric power supply 200 and power coupling element 220 such as for moving from a first location to a second location. Electric vehicle charger 180 further includes a control and communication system 280 also supported on and connected with motorized cart 240 so that electric vehicle charger 180 can move from the first location to the second location by remote control and/or commands from control and communication system 280.

FIG. 2 indicates information transfer between electric power supply 200 and control and communication system 280 with an arrow 282, indicates information transfer between power coupling element 220 and control and communication system 280 with an arrow 284, indicates information transfer between motorized cart 240 and control and communication system 280 with an arrow 286, and indicates information transfer between control and communication system 280 and remote controller 281 with an arrow 287. The information transfer may include data from sensors such as to indicate the status of electric power supply 200, the status of motorized cart 240, operating instructions and/or commands, and/or other information.

Electric power supply 200 may be implemented in one or more embodiments of the present invention in a variety of configurations. According to one embodiment of the present invention, electric power supply 200 comprises an electric energy source such as a battery, a fuel-cell, a capacitor, a connection to an electric power line such as to an electric grid and/or a remote electric power supply, or combinations thereof. In one configuration, the source of the electric energy is stored onboard electric vehicle charger 180 such as storage in the battery, the capacitor, and/or the fuel cell.

Embodiments of the present invention may use a variety of types of power coupling element 220. The type of power coupling element 220 selected for electric vehicle charger 180 will depend on the type of coupling required to transfer power to the electric vehicle. Optionally, electric vehicle charger 180 may have more than one type of power coupling element 220 so as to be able to charge more than one type of electric vehicle. According to one embodiment of the present invention, power coupling element 220 comprises a conductive connector to conduct electric power to a drive battery of the electric vehicle. According to another embodiment of the present invention, power coupling element 220 comprises a coil to inductively provide electric power to charge a drive battery of the electric vehicle.

Motorized cart 240 has a typical structure of a cart with the addition of a motor, an engine, or other drive system. More specifically, motorized cart 240 may include a housing, a frame, a base, and/or a platform having one or more wheels or treads rotatably coupled thereto. The motor is coupled to the one or more wheels or treads to accomplish locomotion of the cart, i.e. movement from place to place, such as from a first location to a second location. The places or the locations can be within a parking area such as a parking lot, a parking structure, or another type of defined area that receives electric vehicles.

Control and communication system 280 may have a variety of configurations for one or more embodiments of the present invention. According to one embodiment of the present invention, control and communication system 280 comprises a computer, a central processing unit, a microprocessor, an electronic memory, an application specific integrated circuit, a field programmable gate array, an information processor, or combinations thereof. Embodiments of the present invention may also have control and communication system 280 further comprising a transmitter circuit, a receiver circuit, a display, a user interface, a light generator, a sound generator, or combinations thereof. According to one or more embodiments of the present invention, the communication system of control and communication system 280 comprises a global positioning system to provide location information for electric vehicle charger 180. The location information can be used for autonomously controlling movement of electric vehicle charger 180 and/or remote control movement of electric vehicle charger 180.

According to one or more embodiments of the present invention, controller and/or communication system 280 comprises a computer program product for charging electric vehicles. The computer program product is embodied in a non-transitory computer readable medium and comprising computer instructions for controlling the performance of electric vehicle charger 180, controlling the actions of electric vehicle charger 180, controlling the place to place movement of electric vehicle charger 180, controlling reception and transmission of information for electric vehicle charger 180, controlling autonomous operation of electric vehicle 180, and combinations thereof. Optionally, the non-transitory computer readable medium may reside entirely on electric vehicle charger 180 or at a remote location such as a network location, a cloud storage location, a network server, or combinations thereof.

According to one or more embodiments of the present invention, the transmitter circuit and/or receiver circuit are embodied in a transmitter or receiver such as those typically used for electronic device communication systems. Examples of electronic device transmitter systems suitable for one or more embodiments of the present invention include, but is not limited to, dedicated short-range communications, BLUETOOTH®, near-field communications technology (NFC), Wi-Fi, a local area network, cloud software application, or a locally-hosted software application.

According to one embodiment of the present invention, remote controller 281 comprises a computer, a mobile computer, a tablet computer, a joystick, a smart phone, device application controls, or other control mechanisms for controlling movement of the electric vehicle charger. Remote controller 281 and control and communication system 280 may be connected by hardware such as hard-wiring or optical fiber for information exchange or remote controller 281 and control and communication system 280 may be wirelessly connected for information exchange 287. Optionally, remote-control may be performed with a user having direct sight of electric vehicle charger 180, with the user having a camera view of the location of electric vehicle charger 180, with a viewing system other than a camera such as a map with global positioning system coordinates, with signal triangulation, or combinations thereof. According to one or more embodiments of the present invention, electric vehicle charger 180 comprises hardware and/or software for remote control operation and/or for autonomous operation of electric vehicle charger 180.

According to one embodiment of the present invention, electric vehicle charger 180 comprises hardware and/or software to direct electric vehicle charger 180 from a first location or place to a second location or place using global positioning satellite coordinates, remote control instructions, a signal from the second location or place, a signal from a wireless network, or combinations thereof. According to still another embodiment of the present invention, the electric vehicle charger 180 comprises hardware and/or software to direct electric vehicle charger 180 to a location proximate the location of a discharged electric vehicle using global positioning satellite coordinates, remote control instructions, a signal from the discharged electric vehicle, a signal from a wireless network, or combinations thereof.

According to one or more embodiments of the present invention, electric vehicle charger 180 comprises one or more electric power supply sensors responsive to the operational state of the electric power supply and connected to the controller to provide data to the controller. Also, controller and communication system 280 comprises hardware components and/or software instructions to direct electric vehicle charger to a re-charge base station in response to a predetermined state of the electric power supply using global positioning satellite coordinates, remote control instructions, a signal from the re-charge base station, a signal from a wireless network, or combinations thereof.

Figure 3:
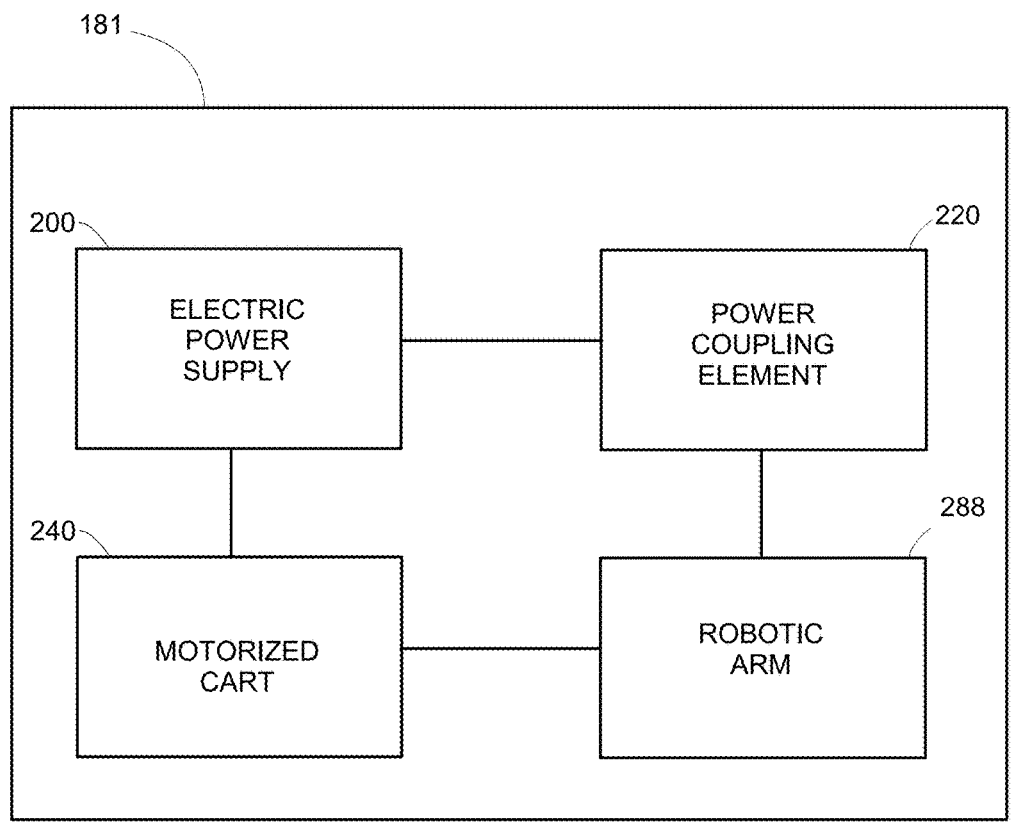
FIG. 3 is a diagram of an electric vehicle charger according to one or more embodiments of the present invention.

Reference is now made to FIG. 3 where there is shown mobile electric vehicle charger 181 according to another embodiment of the present invention. Electric vehicle charger 181 is similar to electric vehicle charger 177 described above and further comprises a robotic arm 288. More specifically, electric vehicle charger 181 comprises an electric power supply 200 and a power coupling element 220. Power coupling element 220 is connected with electric power supply 200 so as to enable transfer of electric energy derived from electric power supply 200 to an electric vehicle (not shown). FIG. 3 also shows electric vehicle charger 181 including a motorized cart 240. Electric power supply 200 is mounted on motorized cart 240 so as to enable locomotion of electric power supply 200 and power coupling element 220 such as for moving from a first location to a second location. Robotic arm 288 is supported by motorized cart 240. Robotic arm 288 is attached to electric power coupling element 220 for movement of electric power coupling element 220 so as to position electric power coupling element 220 to couple electric energy to charge an electric vehicle.

Electric power supply 200 may be implemented in one or more embodiments of the present invention in a variety of configurations. According to one embodiment of the present invention, electric power supply 200 comprises an electric energy source such as a battery, a fuel-cell, a capacitor, a connection to an electric power line such as to an electric grid and/or a remote electric power supply, or combinations thereof. In one configuration, the source of the electric energy is stored onboard electric vehicle charger 181 such as storage in the battery, the capacitor, and/or the fuel cell.

Embodiments of the present invention may use a variety of types of power coupling element 220. The type of power coupling element 220 selected for electric vehicle charger 181 will depend on the type of coupling required to transfer power to the electric vehicle. Optionally, electric vehicle charger 181 may have more than one type of power coupling element 220 so as to be able to charge more than one type of electric vehicle. According to one embodiment of the present invention, power coupling element 220 comprises a conductive connector to conduct electric power to a drive battery of the electric vehicle. According to another embodiment of the present invention, power coupling element 220 comprises a coil to inductively provide electric power to charge a drive battery of the electric vehicle.

Motorized cart 240 has a typical structure of a cart with the addition of a motor, an engine, or other drive system. More specifically, motorized cart 240 may include a housing, a frame, a base, and/or a platform having one or more wheels or treads rotatably coupled thereto. The motor is coupled to the one or more wheels or treads to accomplish locomotion of the cart.

Robotic arm 288 may comprise one or more mechanical joints, one or more segments, one or more actuators, one or more motors, and/or other mechanisms to accomplish robotic mechanical motion with one or more degrees of freedom. The configuration of robotic arm 288 is determined in part by the type of electric vehicles it will be used to charge. Robotic arms for one or more embodiments of the present invention are commercially available.

Figure 4:
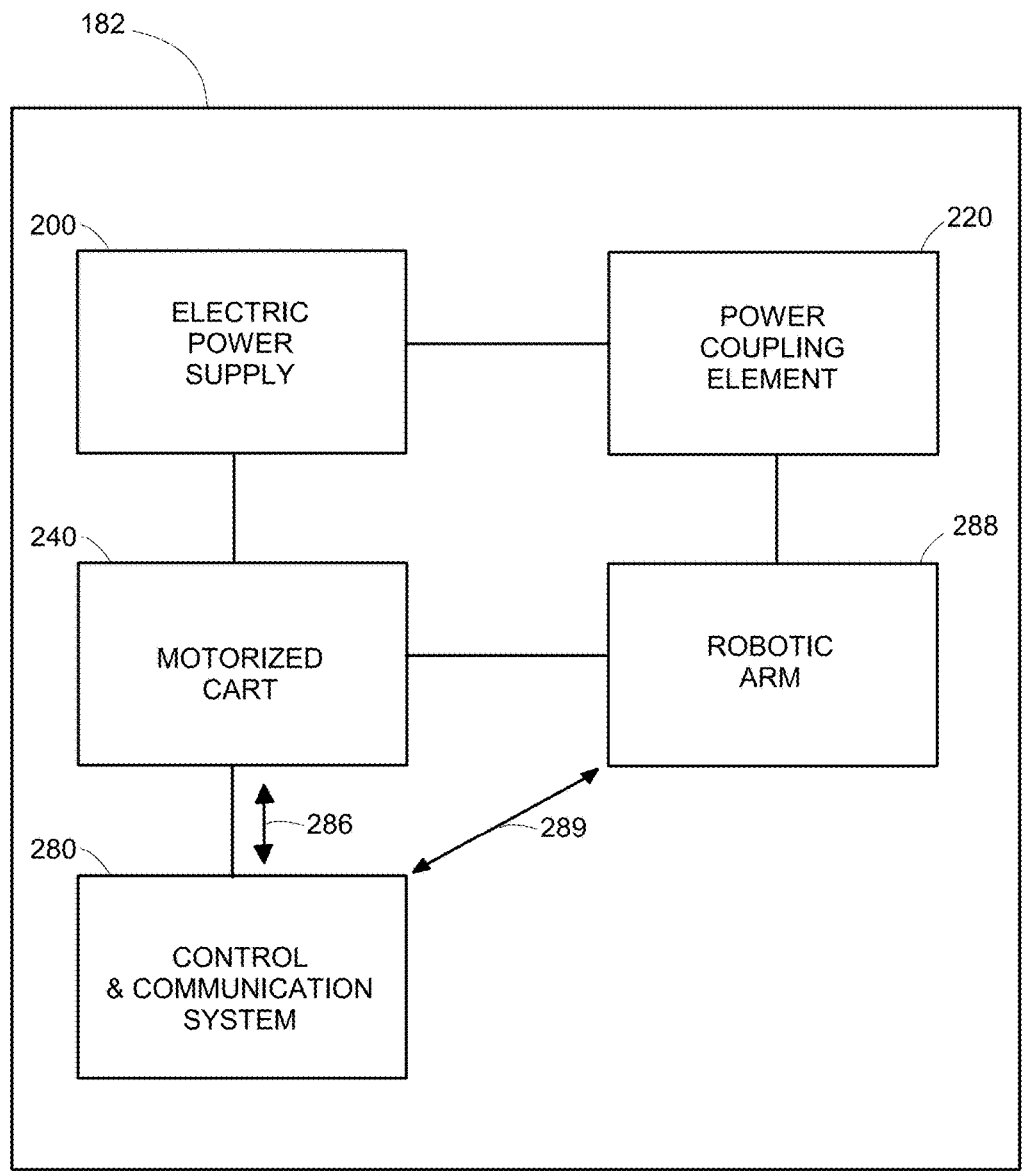
FIG. 4 is a diagram of an electric vehicle charger according to one or more embodiments of the present invention.

Reference is now made to FIG. 4 where there is shown mobile electric vehicle charger 182 according to another embodiment of the present invention. Electric vehicle charger 182 is similar to electric vehicle charger 181 described above and further comprises a control and communication system 280. More specifically, electric vehicle charger 182 comprises an electric power supply 200 and a power coupling element 220. Power coupling element 220 is connected with electric power supply 200 so as to enable transfer of electric energy derived from electric power supply 200 to an electric vehicle (not shown). FIG. 4 also shows electric vehicle charger 182 including a motorized cart 240. Electric power supply 200 is mounted on motorized cart 240 so as to enable locomotion of electric power supply 200 and power coupling element 220 such as for moving from a first location to a second location. Control and communication system 280 is supported on and connected with motorized cart 240 so that electric vehicle charger 182 can move from place to place by remote control and/or commands from control and communication system 280.

Robotic arm 288 is supported by motorized cart 240. Robotic arm 288 is attached to electric power coupling element 220 for movement of electric power coupling element 220 so as to position electric power coupling element 220 to couple electric energy to charge an electric vehicle. Robotic arm 288 is connected with control and communication system 280 to accomplish information transfer and receive commands, instructions, and/or signals that control the operation and movement of robotic arm 288.

FIG. 4 indicates information transfer between motorized cart 240 and control and communication system 280 with an arrow 286 and indicates information transfer between control and communication system 280 and robotic arm 288 with an arrow 289. The information transfer may include data from sensors such as to show the status of motorized cart 240, data from sensors such as to show the status of robotic arm 288, operating instructions and/or commands, or other information.

Electric power supply 200 may be implemented in one or more embodiments of the present invention in a variety of configurations. According to one embodiment of the present invention, electric power supply 200 comprises an electric energy source such as a battery, a fuel-cell, a capacitor, a connection to an electric power line such as to an electric grid and/or a remote electric power supply, or combinations thereof. In one configuration, the source of the electric energy is stored onboard electric vehicle charger 182 such as storage in the battery, the capacitor, and/or the fuel cell.

Embodiments of the present invention may use a variety of types of power coupling element 220. The type of power coupling element 220 selected for electric vehicle charger 182 will depend on the type of coupling required to transfer power to the electric vehicle. Optionally, electric vehicle charger 182 may have more than one type of power coupling element 220 so as to be able to charge more than one type of electric vehicle. According to one embodiment of the present invention, power coupling element 220 comprises a conductive connector to conduct electric power to a drive battery of the electric vehicle. According to another embodiment of the present invention, power coupling element 220 comprises a coil to inductively provide electric power to charge a drive battery of the electric vehicle.

Motorized cart 240 has a typical structure of a cart with the addition of a motor, an engine, or other drive system. More specifically, motorized cart 240 may include a housing, a frame, a base, and/or a platform having one or more wheels or treads rotatably coupled thereto. The motor is coupled to the one or more wheels or treads to accomplish locomotion of the cart such as for operation in a parking area such as a parking lot, a parking structure, or another type of defined area that receives electric vehicles.

Control and communication system 280 may have a variety of configurations for one or more embodiments of the present invention. According to one embodiment of the present invention, control and communication system 280 comprises a computer, a central processing unit, a microprocessor, an electronic memory, an application specific integrated circuit, a field programmable gate array, an information processor, or combinations thereof. Embodiments of the present invention may also have control and communication system 280 further comprising a transmitter circuit, a receiver circuit, a display, a user interface, a light generator, a sound generator, or combinations thereof.

According to one or more embodiments of the present invention, controller and/or communication system 280 comprises a computer program product for charging electric vehicles. The computer program product is embodied in a non-transitory computer readable medium and comprising computer instructions for controlling the performance of electric vehicle charger 182, controlling the actions of electric vehicle charger 182, controlling the place to place movement of electric vehicle charger 182, controlling reception and transmission of information for electric vehicle charger 182, controlling autonomous operation of electric vehicle 182, controlling the operation and movement of robotic arm 288, and combinations thereof. Optionally, the non-transitory computer readable medium may reside entirely on electric vehicle charger 182 or at a remote location such as a network location, a cloud storage location, a network server, or combinations thereof.

According to one or more embodiments of the present invention, the electric vehicle charger 182 may further comprise one or more sensors (sensors not shown in FIG. 4) connected with control and communications system 280 and/or included with robotic arm 288. The sensors may perform a variety of functions to provide information for operation of electric vehicle charger 182. According to one embodiment of the present invention, one or more sensors are sensors for machine vision such as a camera, sensors to detect the location of electric vehicles, sensors to detect the location of electric charging ports or coils on the electric vehicles, sensors to detect orientation and position information for robotic arm 288 so as to accomplish operation of robotic arm 288 using control and communication system 280.

According to one embodiment of the present invention, electric vehicle charger 182 comprises hardware and/or software to direct electric vehicle charger 182 from a location or place to a location of an electric vehicle. The hardware and/or software also control the movement of robotic arm 288 so as to connect power coupling element 220 with an electric vehicle so as to accomplish charging the battery on the electric vehicle. The connection accomplished by the hardware and/or software may be a physical connection such as for conductive charging or it may be an inductive connection such as by inductive charging.

Robotic arm 288 may comprise one or more mechanical joints, one or more segments, one or more actuators, one or more motors, and/or other mechanisms to accomplish robotic mechanical motion with one or more degrees of freedom. The configuration of robotic arm 288 is determined in part by the type of electric vehicles it will be used to charge. Robotic arms for one or more embodiments of the present invention are commercially available. According to one embodiment of the present invention, control and communication system 280 is connected with robotic arm 288 to control the movement of robotic arm 288.

Figure 5:
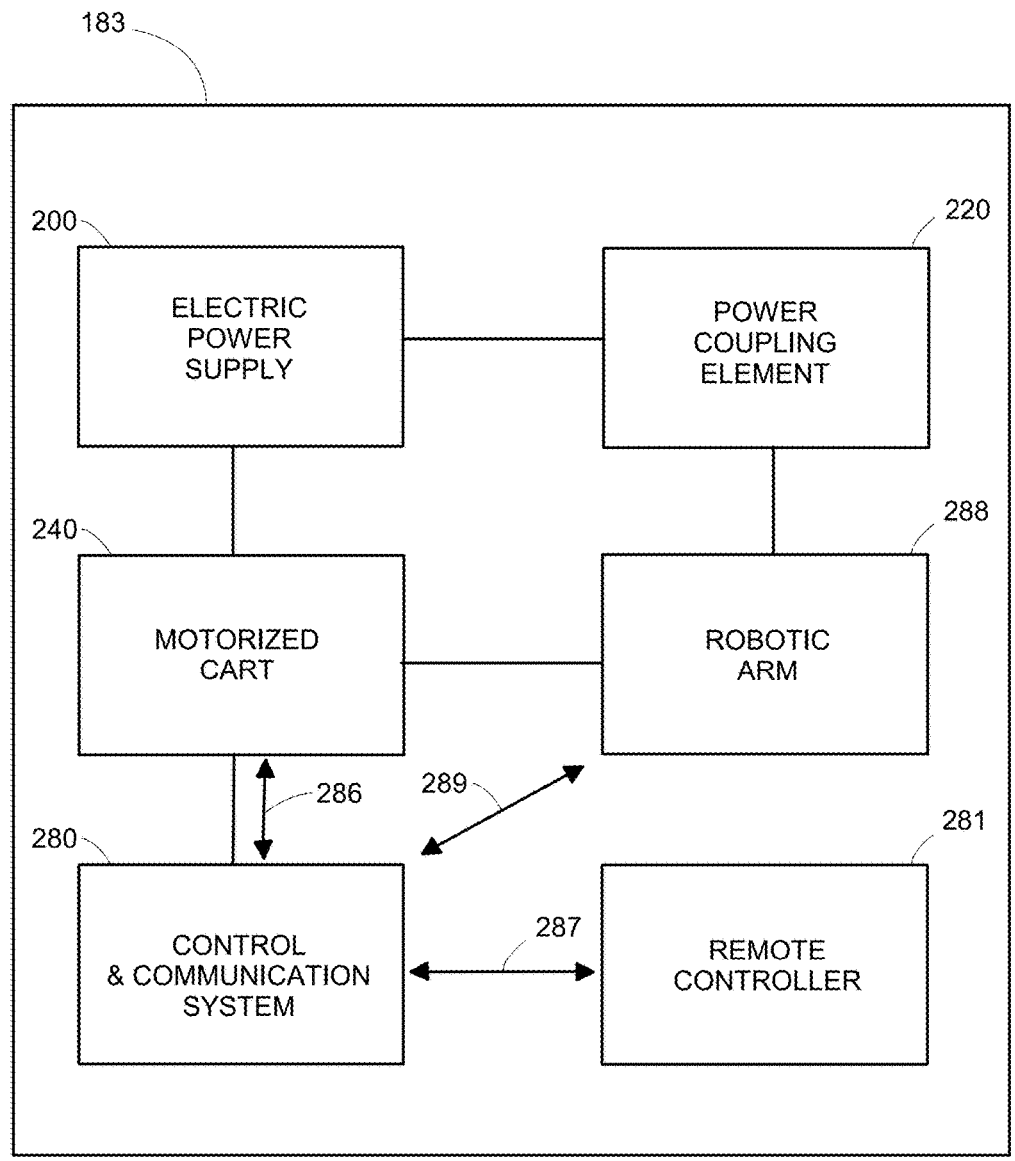
FIG. 5 is a diagram of an electric vehicle charger according to one or more embodiments of the present invention.

Reference is now made to FIG. 5 where there is shown mobile electric vehicle charger 183 according to another embodiment of the present invention. Electric vehicle charger 183 is similar to electric vehicle charger 182 described above and further comprises a remote controller 281. More specifically, electric vehicle charger 183 comprises an electric power supply 200 and a power coupling element 220. Power coupling element 220 is connected with electric power supply 200 so as to enable transfer electric energy derived from electric power supply 200 to an electric vehicle (not shown). FIG. 5 also shows electric vehicle charger 183 including a motorized cart 240. Electric power supply 200 is mounted on motorized cart 240 so as to enable locomotion of electric power supply 200 and power coupling element 220 such as for moving from a first location to a second location. Electric vehicle charger 183 includes control and communication system 280 which is supported on and connected with motorized cart 240 so that electric vehicle charger 183 can move from place to place by remote control and/or commands from control and communication system 280. Electric vehicle charger 183 also includes robotic arm 288 supported by motorized cart 240. Robotic arm 288 is attached to electric power coupling element 220 for movement of electric power coupling element 220 so as to position electric power coupling element 220 to couple electric energy to charge an electric vehicle. Robotic arm 288 is connected with control and communication system 280 to accomplish information transfer and receive commands, instructions, and/or signals that control the operation and movement of robotic arm 288.

FIG. 5 indicates information transfer between motorized cart 240 and control and communication system 280 with an arrow 286, indicates information transfer between control and communication system 280 and remote controller 281 with an arrow 287, and indicates information transfer between control and communication system 280 and robotic arm 288 with an arrow 289. The information transfer may include data from sensors such as to show the status of motorized cart 240, data to show the status of robotic arm to 88, operating instructions and/or commands, or other information.

Electric power supply 200 may be implemented in one or more embodiments of the present invention in a variety of configurations. According to one embodiment of the present invention, electric power supply 200 comprises an electric energy source such as a battery, a fuel-cell, a capacitor, a connection to an electric power line such as to an electric grid and/or a remote electric power supply, or combinations thereof.

Embodiments of the present invention may use a variety of types of power coupling element 220. The type of power coupling element 220 selected for electric vehicle charger 183 will depend on the type of coupling required to transfer power to the electric vehicle. Optionally, electric vehicle charger 183 may have more than one type of power coupling element 220 so as to be able to charge more than one type of electric vehicle. According to one embodiment of the present invention, power coupling element 220 comprises a conductive connector to conduct electric power to a drive battery of the electric vehicle. According to another embodiment of the present invention, power coupling element 220 comprises a coil to inductively provide electric power to charge a drive battery of the electric vehicle.

Motorized cart 240 has a typical structure of a cart with the addition of a motor, an engine, or other drive system. More specifically, motorized cart 240 may include a housing, a frame, a base, and/or a platform having one or more wheels or treads rotatably coupled thereto. The motor is coupled to the one or more wheels or treads to accomplish locomotion of the cart, i.e. movement from place to place, such as from a first location to a second location. The places or the locations can be within a parking area such as a parking lot, a parking structure, or another type of defined area that receives electric vehicles.

Control and communication system 280 may have a variety of configurations for one or more embodiments of the present invention. According to one embodiment of the present invention, control and communication system 280 comprises a computer, a central processing unit, a microprocessor, an electronic memory, an application specific integrated circuit, a field programmable gate array, an information processor, or combinations thereof. Embodiments of the present invention may also have control and communication system 280 further comprising a transmitter circuit, a receiver circuit, a display, a user interface, a light generator, a sound generator, or combinations thereof.

According to one or more embodiments of the present invention, controller and/or communication system 280 comprises a computer program product for charging electric vehicles. The computer program product is embodied in a non-transitory computer readable medium and comprising computer instructions for controlling the performance of electric vehicle charger 183, controlling the actions of electric vehicle charger 183, controlling the place to place movement of electric vehicle charger 183, controlling reception and transmission of information for electric vehicle charger 183, controlling autonomous operation of electric vehicle 183, controlling the operation and movement of robotic arm 288, and combinations thereof. Optionally, the non-transitory computer readable medium may reside entirely on electric vehicle charger 183 or at a remote location such as a network location, a cloud storage location, a network server, or combinations thereof.

According to one or more embodiments of the present invention, the electric vehicle charger 183 may further comprise one or more sensors (sensors not shown in FIG. 5) connected with control and communications system 280 and/or included with robotic arm 288. The sensors may perform a variety of functions to provide information for operation of electric vehicle charger 183. According to one embodiment of the present invention, one or more sensors are sensors for machine vision such as a camera, sensors to detect the location of electric vehicles, sensors to detect the location of electric charging ports or coils on the electric vehicles, sensors to detect orientation and position information for robotic arm 288 so as to accomplish operation of robotic arm 288 using control and communication system 280, sensors to detect human and object obstructions, and/or sensors to detect weather conditions such as relative humidity, rain, temperature, and fog.

According to one embodiment of the present invention, remote controller 281 comprises a computer, a mobile computer, a tablet computer, a joystick, a smart phone, device application controls, or other control mechanisms for controlling movement of the electric vehicle charger. Remote controller 281 and control and communication system 280 may be connected by hardware such as hard-wiring or optical fiber for information exchange or remote controller 281 and control and communication system 280 may be wirelessly connected for information exchange 287. Optionally, remote-control may be performed with a user having direct sight of electric vehicle charger 183, with the user having a camera view of the location of electric vehicle charger 183, with a viewing system other than a camera such as a map with global positioning system coordinates, with signal triangulation, or combinations thereof.

According to one or more embodiments of the present invention, electric vehicle charger 183 comprises hardware and/or software for remote control operation and/or for autonomous operation of electric vehicle charger 183. According to one embodiment, remote controller 281 communicates a user's instructions and/or commands to control a communication system 280. Control and communication system 280 then carries out those instructions or uses the information to control the movement of robotic arm 288. Remote controller 281 may also receive information from control and communication system 280 about robotic arm 288 so that the user can have interactive control of robotic arm 288.

According to one embodiment of the present invention, electric vehicle charger 183 comprises hardware and/or software to direct electric vehicle charger 183 from a location or place to a location of an electric vehicle. The hardware and/or software also control the movement of robotic arm 288 so as to connect power coupling element 220 with an electric vehicle so as to accomplish charging the battery on the electric vehicle. The connection accomplished by the hardware and/or software may be a physical connection such as for conductive charging or it may be an inductive connection such as by inductive charging.

Robotic arm 288 may comprise one or more mechanical joints, one or more segments, one or more actuators, one or more motors, and/or other mechanisms to accomplish robotic mechanical motion with one or more degrees of freedom. The configuration of robotic arm 288 is determined in part by the type of electric vehicles it will be used to charge. Robotic arms for one or more embodiments of the present invention are commercially available.

According to one embodiment of the present invention, controller and communication system 280 are connected with robotic arm 288 to control the movement of robotic arm 288 and/or control the movement of robotic arm 288 with commands from remote controller 281. Alternatively, remote controller 281 may be configured to communicate directly with robotic arm 288 so that robotic arm 28 can be controlled through remote controller 281 without use of control and communication system 280.

Figure 6:
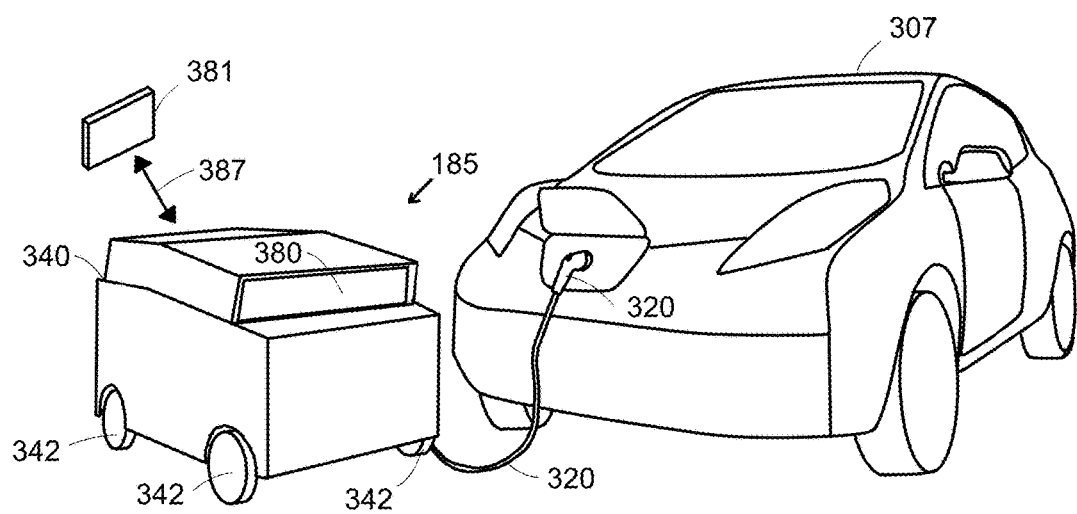
FIG. 6 is a diagram of an electric vehicle charger according to one or more embodiments of the present invention and an electric vehicle.

Reference is now made to FIG. 6 where there is shown a perspective view of a mobile electric vehicle charger 185 according to one embodiment of the present invention. FIG. 6 also shows an electric vehicle 307 placed sufficiently close to electrically charger 185 to accomplish charging electric vehicle 307. Electric vehicle charger 185 is essentially the same as electric vehicle charger 177 or electric vehicle charger 180, described above for FIG. 1 or FIG. 2. More specifically, electric vehicle charger 185 comprises an electric power supply and a power coupling element 320. Power coupling element 320 is connected with the electric power supply so as to enable transfer of electric energy derived from the electric power supply to electric vehicle 307. FIG. 6 also shows electric vehicle charger 185 including a motorized cart 340 which has one or more wheels 342 to facilitate locomotion. The electric power supply is mounted inside motorized cart 340 and is not shown in FIG. 6. Electric vehicle charger 185 further includes a control and communication system 380 also carried on and connected with motorized cart 340 and a remote controller 381 which communicates with control and communication system 380 so that electric vehicle charger 185 can move by remote control and/or commands from control and communication system 380. Arrow 387 indicates a communication link between control and communication system 380 and remote controller 381.

FIG. 6 shows electric vehicle 307 having a charging port on the front of the vehicle. However, electric vehicles may have other locations for the charging port. Embodiments of the present invention can be used with charging ports on other locations of the electric vehicle.

The electric power supply may be implemented in one or more embodiments of the present invention in a variety of configurations. According to one embodiment of the present invention, the electric power supply comprises an electric energy source such as a battery, a fuel-cell, a capacitor, a connection to an electric power line such as to an electric grid and/or a remote electric power supply, or combinations thereof. In one configuration, the source of the electric energy is stored onboard electric vehicle charger 185 such as storage in the battery, the capacitor, and/or the fuel cell.

Power coupling element 320 shown in FIG. 6 is configured for conductive coupling of electric power to electric vehicle 307. Embodiments of the present invention may use a variety of types of power coupling element 320. The type of power coupling element 320 selected for electric vehicle charger 185 will depend on the type of coupling required to transfer power to the electric vehicle. Optionally, electric vehicle charger 185 may have more than one type of power coupling element 320 so as to be able to charge more than one type of electric vehicle 307. Optionally, power coupling element 320 may comprise a coil to inductively provide electric power to charge the drive battery of electric vehicle 307.

According to one embodiment of the present invention, electric vehicle charger 185 is configured so that power coupling element 220 provides an alternating current, which may be at different frequencies or voltage from the electric grid voltage or frequency. According to another embodiment of the present invention, electric vehicle charger 185 is configured so that power coupling element 220 provides a direct current, which may be at different voltage from the electric grid. In other words, one or more embodiments of the present invention include electric vehicle charger 185 configured to provide current at voltages and/or frequencies that can be received by electric vehicle 307.

Motorized cart 340 has a typical structure of a cart with the addition of a motor, an engine, or other drive system (not visible in FIG. 6). More specifically, motorized cart 340 includes a housing and may further include a frame, a base, and/or a platform (not visible in FIG. 6). The motor is coupled to the one or more wheels 342 to accomplish locomotion from place to place within a parking lot, a parking structure, or another type of defined area that receives electric vehicles.

Control and communication system 380 may have a variety of configurations for one or more embodiments of the present invention. According to one embodiment of the present invention, control and communication system 880 comprises a computer, a central processing unit, a microprocessor, an electronic memory, an application specific integrated circuit, a field programmable gate array, an information processor, or combinations thereof. Embodiments of the present invention may also have control and communication system 280 further comprising a transmitter circuit, a receiver circuit, a display, a user interface, a light generator, a sound generator, or combinations thereof. According to one or more embodiments of the present invention, the communication system of control and communication system 380 comprises a global positioning system to provide location information for electric vehicle charger 185. The location information can be used for autonomously controlling movement of electric vehicle charger 185 and/or remote control movement of electric vehicle charger 185.

According to one or more embodiments of the present invention, controller and/or communication system 380 comprises a computer program product for charging electric vehicles. The computer program product is embodied in a non-transitory computer readable medium and comprising computer instructions for controlling the performance of electric vehicle charger 185, controlling the actions of electric vehicle charger 185, controlling the place to place movement of electric vehicle charger 185, controlling reception and transmission of information for electric vehicle charger 185, controlling autonomous operation of electric vehicle 185, and combinations thereof. Optionally, the non-transitory computer readable medium may reside entirely on electric vehicle charger 185 or at a remote location such as a network location, a cloud storage location, a network server, or combinations thereof.

According to one or more embodiments of the present invention, the electric vehicle charger 185 may further comprise one or more sensors (sensors not shown in FIG. 6) connected with control and communications system 380 and/or included with control and communication system 380. The sensors may perform a variety of functions to provide information for operation of electric vehicle charger 185. According to one embodiment of the present invention, one of the sensors is responsive to the operational state of the electric power supply and is disposed so as to provide data to control and communication system 380. According to another embodiment of the present invention, one or more sensors are included which provide data about the surroundings of electric vehicle charger 185; examples of these sensors include, but are not limited to, impediments sensors such as to detect the presence of barriers or other obstructions to the movement of electric vehicle charger 185, sensors for machine vision such as a camera, sensors to detect the location of electric vehicles, sensors to detect the location of electric charging ports or coils on the electric vehicles, sensors to detect foreign objects, sensors to detect any other object electric vehicle charger 185 needs to detect in order to operate autonomously and/or by remote control, and combinations thereof.

According to one embodiment of the present invention, remote controller 381 comprises a computer, a mobile computer, a tablet computer, a joystick, a smart phone, device application controls, or other control mechanisms for controlling movement of the electric vehicle charger. Electric vehicle charger 185 comprises hardware and/or software to accomplish remote control operation of electric vehicle charger 185. Optionally, remote controller 381 and control and communication system 380 may be connected by hardware such as hardwiring or optical fiber for information exchange or remote controller 381 and control and communication system 380 may be wirelessly connected for information exchange. Optionally, remote-control may be performed with a user having direct sight of electric vehicle charger 185, with the user having a camera view of the location of electric vehicle charger 185, with a viewing system other than a camera such as a map with global positioning system coordinates, with signal triangulation, or combinations thereof.

Figure 7:
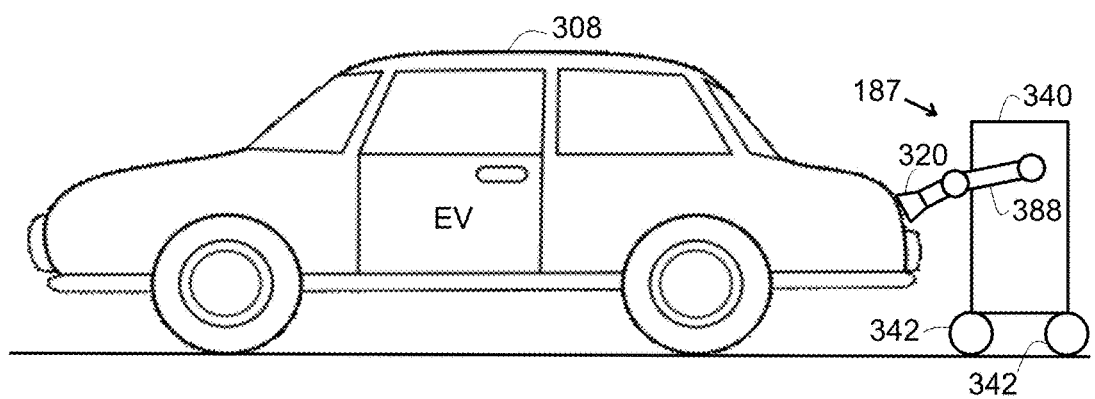
FIG. 7 is a diagram of an electric vehicle charger according to one or more embodiments of the present invention and an electric vehicle.

Reference is now made to FIG. 7 where there is shown a side view of a mobile electric vehicle charger 187 according to another embodiment of the present invention connected with an electric vehicle 308 to charge electric vehicle 308. Electric vehicle charger 187 is essentially the same as electric vehicle charger 181 described above. More specifically, electric vehicle charger 187 comprises an electric power supply (not visible in FIG. 7), a power coupling element 320, a control and communication system (not visible in FIG. 7), and a robotic arm 388. Power coupling element 320 is connected with the electric power supply so as to enable transfer of electric energy derived from the electric power supply to an electric vehicle 308. FIG. 7 also shows electric vehicle charger 187 including a motorized cart 340 with one or more wheels 342. The electric power supply is mounted in motorized cart 340 so as to enable locomotion of the electric power supply and power coupling element 320. Robotic arm 388 is also joined to motorized cart 340. Robotic arm 388 is attached to electric power coupling element 320 for movement of electric power coupling element 320 so as to position electric power coupling element 320 to couple electric energy to charge electric vehicle 308. Robotic arm 388 is connected with the control and communication system to accomplish information transfer and receive commands, instructions, and/or signals that control the operation and movement of robotic arm 388.

The electric power supply may be implemented in one or more embodiments of the present invention in a variety of configurations. According to one embodiment of the present invention, the electric power supply comprises an electric energy source such as a battery, a fuel-cell, a capacitor, a connection to an electric power line such as to an electric grid and/or a remote electric power supply, or combinations thereof. In one configuration, the source of the electric energy is stored onboard electric vehicle charger 187 such as storage in the battery, the capacitor, and/or the fuel cell.

Embodiments of the present invention may use a variety of types of power coupling element 320. The type of power coupling element 320 selected for electric vehicle charger 187 will depend on the type of coupling required to transfer power to the electric vehicle. Optionally, electric vehicle charger 187 may have more than one type of power coupling element 320 so as to be able to charge more than one type of electric vehicle. According to one embodiment of the present invention, power coupling element 320 comprises a conductive connector to conduct electric energy to a drive battery of the electric vehicle. According to another embodiment of the present invention, power coupling element 320 comprises a coil to inductively provide electric power to charge a drive battery of the electric vehicle.

Motorized cart 340 has a typical structure of a cart with the addition of a motor, an engine, or other drive system. More specifically, motorized cart 340 may include a housing, a frame, a base, and/or a platform having one or more wheels rotatably coupled thereto. The motor (not shown in FIG. 7) is coupled to the one or more wheels 342 to accomplish locomotion of the cart.

Robotic arm 388 may comprise one or more mechanical joints, one or more segments, one or more actuators, one or more motors, and/or other mechanisms to accomplish robotic mechanical motion with one or more degrees of freedom. The configuration of robotic arm 388 is determined in part by the type of electric vehicles it will be used to charge. Robotic arms which can be adapted for one or more embodiments of the present invention are commercially available.

The control and communication system may have a variety of configurations for one or more embodiments of the present invention. According to one embodiment of the present invention, the control and communication system comprises a computer, a central processing unit, a microprocessor, an electronic memory, an application specific integrated circuit, a field programmable gate array, an information processor, or combinations thereof. Embodiments of the present invention may also have the control and communication system further comprising a transmitter circuit, a receiver circuit, a display, a user interface, a light generator, a sound generator, or combinations thereof.

According to one or more embodiments of the present invention, the control and communication system comprises a computer program product for charging electric vehicles. The computer program product is embodied in a non-transitory computer readable medium and comprising computer instructions for controlling the performance of electric vehicle charger 187, controlling the actions of electric vehicle charger 187, controlling the place to place movement of electric vehicle charger 187, controlling reception and transmission of information for electric vehicle charger 187, controlling autonomous operation of electric vehicle 187, controlling the operation and movement of robotic arm 388, and combinations thereof. Optionally, the non-transitory computer readable medium may reside entirely on electric vehicle charger 187 or at a remote location such as a network location, a cloud storage location, a network server, or combinations thereof.

According to one or more embodiments of the present invention, the electric vehicle charger 187 may further comprise one or more sensors (sensors not shown in FIG. 7) connected with the control and communications system and/or included with robotic arm 388. The sensors may perform a variety of functions to provide information for operation of electric vehicle charger 187. According to one embodiment of the present invention, one or more sensors are sensors for machine vision such as a camera, sensors to detect the location of electric vehicles, sensors to detect the location of electric charging ports or coils on the electric vehicles, sensors to detect orientation and position information for robotic arm 388 so as to accomplish operation of robotic arm 388 using the control and communication system 380.

According to one embodiment of the present invention, electric vehicle charger 187 comprises hardware and/or software to direct electric vehicle charger 187 from a location or place to a location of an electric vehicle. The hardware and/or software also controls the movement of robotic arm 388 so as to connect power coupling element 320 with electric vehicle 308 so as to accomplish charging the battery on electric vehicle 308. The connection accomplished by the hardware and/or software may be a physical connection such as for conductive charging or it may be an inductive connection such as by inductive charging.

Figure 8:
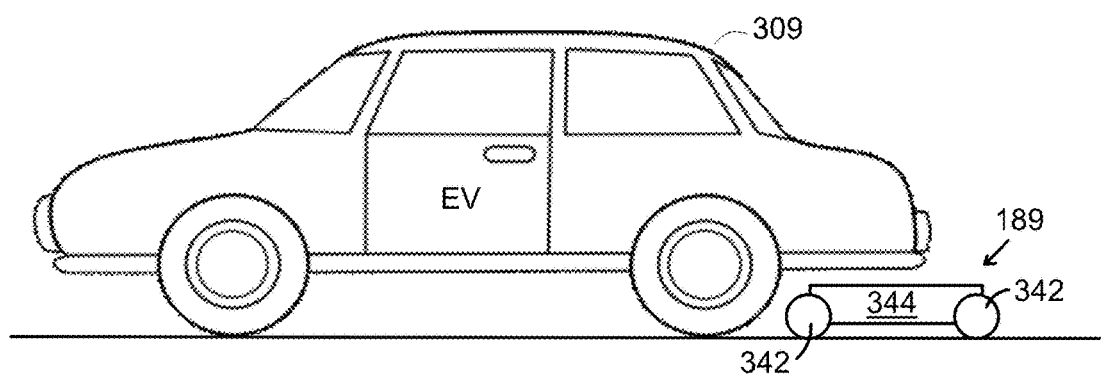
FIG. 8 is a diagram of an electric vehicle charger according to one or more embodiments of the present invention and an electric vehicle.

Reference is now made to FIG. 8 where there is shown a side view of a mobile electric vehicle charger 189 according to one embodiment of the present invention. FIG. 8 also shows an electric vehicle 309. A portion of electric vehicle charger 189 is placed beneath the undercarriage of an electric vehicle 309 to accomplish charging electric vehicle 309. Electric vehicle charger 189 is essentially the same as electric vehicle charger 177 or electric vehicle charger 180, described above for FIG. 1 or FIG. 2. More specifically, electric vehicle charger 189 comprises an electric power supply and a power coupling element. The power coupling element is connected with the electric power supply so as to enable transfer of electric energy derived from the electric power supply to electric vehicle 309. FIG. 8 shows electric vehicle charger 189 including a motorized cart 344 which has one or more wheels 342 to facilitate locomotion. The electric power supply (not shown in FIG. 8) is mounted in motorized cart 344. Electric vehicle charger 189 further includes a control and communication system also carried with and connected with motorized cart 340 so that electric vehicle charger 189 can move by remote control and/or commands from the control and communication system.

According to one embodiment of the present invention, mobile electric vehicle charger 189 has dimensions so that it can fit beneath electric vehicle 309 to effect charging the electrical storage system on electric vehicle 309. Mobile electric vehicle charger 189 may move or may be moved, such as by remote control, to the underside of the electric vehicle for the electric charging process.

The electric power supply may be implemented in one or more embodiments of the present invention in a variety of configurations. According to one embodiment of the present invention, the electric power supply comprises an electric energy source such as a battery, a fuel-cell, a capacitor, a connection to an electric power line such as to an electric grid and/or a remote electric power supply, or combinations thereof. In one configuration, the source of the electric energy is stored onboard electric vehicle charger 189 such as storage in the battery, the capacitor, and/or the fuel cell.

The power coupling element (not shown in FIG. 8) of electric vehicle charger 189 is configured for inductive coupling of electric power to electric vehicle 309. Optionally, electric vehicle charger 189 may have more than one type of power coupling element so as to be able to charge more than one type of electric vehicle. One or more embodiments of the present invention include electric vehicle charger 189 configured to provide current at voltages and/or frequencies that can be received by electric vehicle 309.

Motorized cart 344 has a typical structure of a cart with the addition of a motor, an engine, or other drive system (not visible in FIG. 8). More specifically, motorized cart 344 includes a housing and may further include a frame, a base, and/or a platform (not visible in FIG. 8). The motor is coupled to the one or more wheels 342 to accomplish locomotion. As shown in FIG. 8, electric vehicle charger 189 is sized so that it can travel beneath the undercarriage of electric vehicle 309 so as to reach and couple to a coil or other power receiving mechanism for charging electric vehicle 309. Alternatively, another embodiment of the present invention may be configured so that at least a portion of electric vehicle charger 189 can fit beneath the undercarriage of electric vehicle 309. The power coupling element of electric vehicle charger 189 is included with the portion of electric vehicle charger 189 that can fit beneath the undercarriage of electric vehicle 309.

The control and communication system may have a variety of configurations for one or more embodiments of the present invention. According to one embodiment of the present invention, the control and communication system comprises a computer, a central processing unit, a microprocessor, an electronic memory, an application specific integrated circuit, a field programmable gate array, an information processor, or combinations thereof. Embodiments of the present invention may also have the control and communication system further comprising a transmitter circuit, a receiver circuit, a display, a user interface, a light generator, a sound generator, or combinations thereof. According to one or more embodiments of the present invention, the communication system of the control and communication system comprises a global positioning system to provide location information for electric vehicle charger 189. The location information can be used for autonomously controlling movement of electric vehicle charger 189 and/or remote control movement of electric vehicle charger 189.

According to one or more embodiments of the present invention, controller and/or communication system 380 comprises a computer program product for charging electric vehicles. The computer program product is embodied in a non-transitory computer readable medium and comprising computer instructions for controlling the performance of electric vehicle charger 189, controlling the actions of electric vehicle charger 189, controlling the place to place movement of electric vehicle charger 189, controlling reception and transmission of information for electric vehicle charger 189, controlling autonomous operation of electric vehicle 189, controlling the alignment of the power coupling element with an electric energy receiving coil of electric vehicle 309, and combinations thereof. Optionally, the non-transitory computer readable medium may reside entirely on electric vehicle charger 189 or at a remote location such as a network location, a cloud storage location, a network server, or combinations thereof.

According to one or more embodiments of the present invention, the electric vehicle charger 189 may further comprise one or more sensors (sensors not shown in FIG. 6) connected with control and communications system 380 and/or included with control and communication system 380. The sensors may perform a variety of functions to provide information for operation of electric vehicle charger 189. According to one embodiment of the present invention, one of the sensors is responsive to the operational state of the electric power supply and is disposed so as to provide data to control and communication system 380. According to another embodiment of the present invention, one or more sensors are included which provide data about the surroundings of electric vehicle charger 189; examples of these sensors include, but are not limited to, impediments sensors such as to detect the presence of barriers or other obstructions to the movement of electric vehicle charger 189, sensors for machine vision such as a camera, sensors to detect the location of electric vehicles, sensors to detect the location of electric charging ports or coils on the electric vehicles, sensors to detect foreign objects, sensors to control the alignment of the power coupling element with an electric energy receiving coil of electric vehicle 309, sensors to detect any other object electric vehicle charger 189 needs to detect in order to operate autonomously and/or by remote control, and combinations thereof.

One or more embodiments of the present invention comprise a self-aligning inductive coil, where either the receiving coil on an electric vehicle or the transmitting coil on an electric vehicle charger can move to increase the coupling of the two coils for energy transfer. Electric vehicle charger 189 is one example of an electric vehicle charger that is accomplishes self alignment of its power coupling element configured as an induction coil with the power receiving coil of an electric vehicle. According to one embodiment of the present invention, the driver will park so that the receiving coil is in the range of motion of the transmitting coil, and then one or both coils will move to better align themselves with the other coil. This can be done, according to one embodiment, by enabling communication between the electric vehicle and the electric vehicle charger with the transmitting coil to allow both coils to accurately determine the location and the axis of the other coil. Once the axes and the locations of the coils are determined, the transmitting coil on the electric vehicle charger will perform one or both of the following actions: 1) move itself autonomously, either on rails, actuators, or wheels or any other mechanism, to align itself to improve coupling and/or move itself and/or move an attached sub-module or other structure that includes the transmitting coil upwards to reduce the gap between the two coils in order to improve induction coupling.

Embodiments of the present invention described above and for FIGS. 1-8 include a motorized cart. Alternatively, the motorized cart described above and in FIGS. 1-8 may be replaced by a manual cart that is not motorized. Unlike the motorized cart described above for FIGS. 1-8, the manual cart does not include a motor, an engine, or other drive system for it to propel itself. The manual cart must be moved manually from place to place by something else. Consequently, mobile electric vehicle chargers that use a manual cart instead of a motorized cart must be pushed, pulled, or carried from place to place by something else which could be, but not limited to, a user or other person, a golf cart, a forklift, a vehicle, a motorized dolly, other motorized device, or combinations thereof.

In view of the present disclosure, persons of ordinary skill in the art will realize additional configurations for embodiments of the present invention. TABLE 1 provides descriptions of some examples of additional configurations of embodiments of the present invention.

TABLE 1

| Configuration | EV Charging Mechanism | Energy Storage | Charging Type | Coupling Mechanism | Movement |
|---|---|---|---|---|---|
| 1 | Inductive | Yes - onboard energy storage | AC | Existing Charge Port | Autonomous |
| 2 | Inductive | Yes - onboard energy storage | AC | Existing Charge Port | Manual |
| 3 | Inductive | Yes - onboard energy storage | AC | New Charge Port | Autonomous |
| 4 | Inductive | Yes - onboard energy storage | AC | New Charge Port | Manual |
| 5 | Inductive | Yes - onboard energy storage | DC | Existing Charge Port | Autonomous |
| 6 | Inductive | Yes - onboard energy storage | DC | Existing Charge Port | Manual |
| 7 | Inductive | Yes - onboard energy storage | DC | New Charge Port | Autonomous |
| 8 | Inductive | Yes - onboard energy storage | DC | New Charge Port | Manual |
| 9 | Inductive | None/Limited - wired to the grid | AC | Existing Charge Port | Autonomous |
| 10 | Inductive | None/Limited - wired to the grid | AC | Existing Charge Port | Manual |
| 11 | Inductive | None/Limited - wired to the grid | AC | New Charge Port | Autonomous |
| 12 | Inductive | None/Limited - wired to the grid | AC | New Charge Port | Manual |
| 13 | Inductive | None/Limited - wired to the grid | DC | Existing Charge Port | Autonomous |
| 14 | Inductive | None/Limited - wired to the grid | DC | Existing Charge Port | Manual |
| 15 | Inductive | None/Limited - wired to the grid | DC | New Charge Port | Autonomous |
| 16 | Inductive | None/Limited - wired to the grid | DC | New Charge Port | Manual |
| 17 | Conductive | Yes - onboard energy storage | AC | Existing Charge Port | Autonomous |
| 18 | Conductive | Yes - onboard energy storage | AC | Existing Charge Port | Manual |
| 19 | Conductive | Yes - onboard energy storage | AC | New Charge Port | Autonomous |
| 20 | Conductive | Yes - onboard energy storage | AC | New Charge Port | Manual |

TABLE 1-continued

| Configu-ration | EV Charging Mechanism | Energy Storage | Charging Type | Coupling Mechanism | Movement |
|---|---|---|---|---|---|
| 21 | Conductive | Yes - onboard energy storage | DC | Existing Charge Port | Autonomous |
| 22 | Conductive | Yes - onboard energy storage | DC | Existing Charge Port | Manual |
| 23 | Conductive | Yes - onboard energy storage | DC | New Charge Port | Autonomous |
| 24 | Conductive | Yes - onboard energy storage | DC | New Charge Port | Manual |
| 25 | Conductive | None/Limited - wired to the grid | AC | Existing Charge Port | Autonomous |
| 26 | Conductive | None/Limited - wired to the grid | AC | Existing Charge Port | Manual |
| 27 | Conductive | None/Limited - wired to the grid | AC | New Charge Port | Autonomous |
| 28 | Conductive | None/Limited - wired to the grid | AC | New Charge Port | Manual |
| 29 | Conductive | None/Limited - wired to the grid | DC | Existing Charge Port | Autonomous |
| 30 | Conductive | None/Limited - wired to the grid | DC | Existing Charge Port | Manual |
| 31 | Conductive | None/Limited - wired to the grid | DC | New Charge Port | Autonomous |
| 32 | Conductive | None/Limited - wired to the grid | DC | New Charge Port | Manual |

Electric vehicle chargers according to one embodiment of the present invention, include an electric power supply that comprises a 10 kWh capacity battery such as new and/or second-life battery such as a Nissan Leaf battery modules. Embodiments of the present invention may have vehicle charging speeds of up to 5 kW using a power coupling element such as a J1772 AC plug. According to another embodiment of the present invention, electric power supply comprises a 48 kWh capacity battery and may have vehicle charging speeds of up to 5 kW using a power coupling element dual Level 2 connector such as J1772 AC and single Level 3 connector such as CHAdeMO or SAE Combo electrical charging.

One or more embodiments of the present invention comprise methods and apparatuses that enable the mobile electric vehicle charger to automatically open or close an electric vehicle's charging port. Optionally, embodiments of the present invention may include hardware, software, machine implemented processes, systems, or other mechanisms to accomplish one or more of, but not limited to, the following actions: Allowing the charger to detect or otherwise know the radio signal of the electric vehicle's charging port in order to unlock, lock, open, and close the port. Having an electric vehicle manufacturer's rolling codes programmed into the mobile electric vehicle charger similar to the way a key fob is programmed for an electric vehicle. Allowing the mobile charger to physically collect and store the electric vehicle's key fob. This may be done using a secure storage location on the charger, and it will allow the charger to operate the electric vehicle's key fob to unlock, lock, open, or close the charging port. Using dedicated short-range communications technology to send an unlock or lock signal to an electric vehicle or to an aftermarket accessory installed on the electric vehicle. Using BLUETOOTH® technology to send an unlock or lock signal to the electric vehicle or to an aftermarket accessory installed on the electric vehicle. Using internet-based cloud software to directly send unlock, lock, open, or close signals to an electric vehicle or to an aftermarket accessory installed on the electric vehicle. Using local Wi-Fi or a local network to directly send unlock, lock, open, or close signals to an electric vehicle or to an aftermarket accessory installed on the electric vehicle. Using one-time or multiple-use digital keys on smart phones, mobile devices, or via the mobile electric vehicle charger.

Another aspect of the present invention is a system for charging electric vehicles. The electric vehicles can be substantially any type of electric vehicle such as an electric car, electric truck, or other type of electric vehicle form of transportation. The electric vehicle has a charging port for receiving electric energy during the charging process. The charging port may be located on the top, the bottom, the side, the front, or the back of the electric vehicle. The charging may be accomplished by inductive charging or by conductive charging. The system includes one or more mobile electric vehicle chargers as described above. The system also includes a network or other type of communication system that can receive information, transmit information, store information, process information, execute instructions, and/or combinations thereof.

Figure 9:
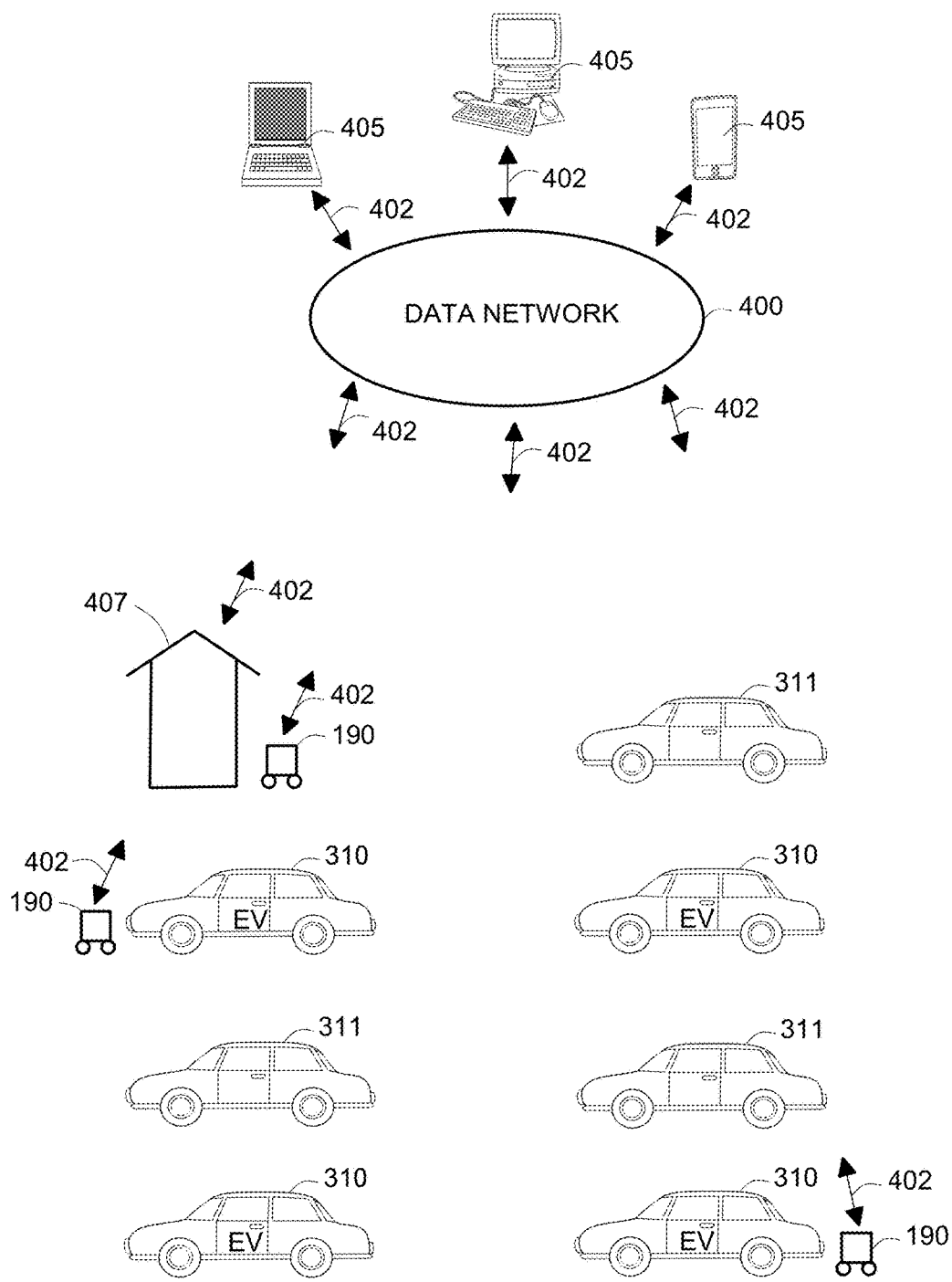
FIG. 9 is a diagram of a system for charging electric vehicles according to one or more embodiments of the present invention.

Reference is now made to FIG. 9 which illustrates an electric charging system according to one or more embodiments of the present invention for charging electric vehicles using mobile electric vehicle chargers. The charging system comprises one or more mobile electric vehicle chargers 190 disposed in a parking area such as a parking lot or parking structure. Electric vehicle chargers 190 are essentially the same as any of the electric vehicle chargers described above and in FIGS. 1-8.

FIG. 9 also shows a data network 400 such as a computer network. Data network 400 may be a local network or may be a remote network such as a cloud-based network or internet. Data network 400 may be implemented as a combination of data processors, computers, servers, communication devices, routers, gateways, software, multiple networks, or combinations thereof. Electric vehicle chargers 190 and data network 400 are configured to have communication links 402 for information transfer which may be accomplished, at least in part, using a control and communication system of the electric vehicle chargers 190.

The charging system also includes one or more information and/or communication devices 405 which also have communication links 402 with data network 400. Information and/or communication devices 405 may be implemented as a computer, a smart phone, a tablet computer, a laptop computer, a remote controller, or other type of electronic device typical for data communication.

One or more embodiments of the electric vehicle charging system may also include a base station 407 located at or near the parking area. Based station 407 includes hardware and/or connections with electrical power sources for recharging electric vehicle chargers 190, power converters, replacement electric power supplies, control equipment and/or software and may also have hardware and/or software to form communication links 402 with data network 400. Electrical power sources for base station 407 may be a connection to the electric grid, another remote power source, or a power source located at the parking area or parking structure. As another option, the recharging of the electric vehicle chargers 190 may be accomplished using solar energy converters, wind energy converters, or other renewable energy sources which may be located at or adjacent to the parking area or at a remote location. The recharging of the electric vehicle charger 177 can be used to accomplish electricity use load leveling and/or storage of as generated and excess energy from the renewable energy sources. According to one embodiment of the present invention, base station 407 includes electricity storage capabilities such as, but not limited to, batteries and capacitors which can be used to recharge electric vehicle chargers 190. The electricity storage capabilities of base station 407 may also be used for load leveling in cooperation with receiving electricity from the electric grid. As an option for one or more embodiments of the present invention, base station 407 may be a fixed structure or it may be a mobile structure.

According to one embodiment of the present invention, base station 407 comprises a central energy storage facility that recharges mobile electric vehicle chargers 190. For one or more embodiments of the present invention, electric vehicle chargers 190 have onboard energy storage configured as an easy to replace electric power supply that uses, for example, quick connect/disconnect fasteners and electrical contacts for holding and contacting a battery or capacitor so as to have a modular configuration. In other words, electric vehicle chargers 190 may be modular and have detachable electric power supplies and the electric power supply can be recharged even when detached from the electric vehicle charger. Optionally, base station 407 may provide a supply of the electric vehicle charger power supplies that can be used to replace depleted electric vehicle charger power supplies; this can be done instead of recharging the electric vehicle charger power while still on the electric vehicle charger.

According to one embodiment of the present invention, the base station has a centralized energy storage system. The centralized energy storage system for the base station can be batteries, capacitors, or any other type of energy storage, or combinations thereof. This centralized energy storage system can be charged either independently of the mobile electric vehicle charger or when one or more mobile chargers are present. The mobile electric vehicle chargers will be able to access the centralized energy storage, power from the electric grid, or any combination thereof.

FIG. 9 shows the parking area having one or more electric vehicles 310 and one or more non-electric vehicles 311. Electric vehicles 310 may also have communications links 402 with data network 400. According to one or more embodiments of the present invention, communication links may be established directly or established through data network 400 between any combination of the electric vehicle chargers 190, information and/or communication devices 405, base station 407, and electric vehicles 310.

According to one embodiment of the present invention, the data network comprises transmitters and receivers to allow communication between one or more mobile chargers and one or more charging base stations. According to one embodiment of the present invention, the data network comprises transmitters and receivers to allow communication between one or more mobile chargers and one or more local charger networks. According to one embodiment of the present invention, the data network comprises transmitters and receivers to allow communication between one or more mobile chargers and a global charger network. According to one embodiment of the present invention, the data network comprises transmitters and receivers to allow communication between one or more base stations. According to one embodiment of the present invention, the data network comprises transmitters and receivers to allow communication between one or more base stations and one or more local charger networks. According to one embodiment of the present invention, the data network comprises transmitters and receivers to allow communication between one or more base stations and one or more global charger networks. According to one embodiment of the present invention, the data network comprises transmitters and receivers to allow communication between one or more local charger networks. According to one embodiment of the present invention, the data network comprises transmitters and receivers to allow communication between one or more local charger networks and a global charger network.

One or more processes performed by the communication network may include, but are not be limited to, optimizing traffic patterns of one or more mobile chargers, sending location information, sending information about the state of charge, sending information about the state of demand on the electric grid, sending information about electric vehicles, sending information about the activities or status of the parking area, and/or tracking usage metrics of mobile electric vehicle chargers. This communication may use, but is not limited to, one or more of the following technologies: dedicated short-range communications, BLUETOOTH®, near-field communications technology, Wi-Fi, a local area network, cloud software application, or a locally-hosted software application.

Another aspect of the present invention pertains to a method of carrying out a process such as charging electric vehicles. One or more embodiments of the method uses one or more electric vehicle chargers like the electric vehicle chargers described above and/or one or more systems for electric vehicle charging like the system described above.

According to one embodiment of the present invention, the method comprises providing to a parking area which receives one or more electric vehicles a mobile electric vehicle charger having hardware and/or software to accomplish autonomous or remote control operation. As examples, the electric vehicle charger may be substantially the same as electric vehicle chargers 175, 177, 180, 181, 182, 185, 187, 189, or 190 described above. The method further includes operating the mobile electric vehicle charger under autonomous or remote control to charge the one or more electric vehicles by sequentially moving the mobile electric vehicle charger to within sufficient proximity of the one or more electric vehicles to establish an electrical charging connection. The parking area is an area such as a parking lot or a parking structure. In addition to receiving electric vehicles, the parking area may also have nonelectric vehicles present. The electric vehicles can be parked in substantially any of the parking spaces of the parking area; the electric vehicle chargers can be moved to each or any of the electric vehicles in need of charging.

According to one or more embodiments of the present invention, the electric vehicle chargers used for charging electric vehicles have a compact design so that they do not have a large base area which could obstruct the movement of traffic in the parking area when electric vehicles are being charged or which require use of a parking space for the electric vehicle charger during the process of charging each of the one or more electric vehicles.

According to one embodiment of the present invention, the method also includes providing a data network such as, for example, data network 400 described above and providing one or more information and/or communication devices having communication links with the data network. The information and/or communication devices may be implemented as a computer, a smart phone, a tablet computer, a laptop computer, a remote controller, or other type of electronic device typical for data communication. The electrically charger also has a communication link with the data network. According to one embodiment of the present invention, the method also includes providing a base station located adjacent to or within the parking area. An example of a suitable base station is base station 407 as described above.

According to one embodiment of the present invention, the method includes having the mobile electric vehicle charger determine the location of the one or more electric vehicles and propel itself to the one or more electric vehicles. According to another embodiment of the present invention the method includes having the mobile electric vehicle charger obtain the location of the one or more electric vehicles by communication with the one or more electric vehicles, receiving global positioning satellite coordinates for the one or more electric vehicles, receiving a signal from the one or more electric vehicles, receiving location information from a driver or attendant for the electric vehicle, or combinations thereof, and the electric vehicle charger propels itself to the one or more electric vehicles.

According to one embodiment of the present invention, the method further comprises having the mobile electric vehicle charger go to a base station for recharging when recharging is needed or when there are no electric vehicles needing charging. According to another embodiment of the present invention, the method further comprises providing a base station with recharged replacement power supplies for the electric vehicle chargers and having the mobile electric vehicle chargers go to the base station for replacement of a depleted electric vehicle power supply. Replacing the depleted electric vehicle power supply can be done instead of recharging the depleted electric vehicles power supply while it is still on the electric vehicle charger.

According to another embodiment of the present invention, the method further comprises having the mobile electric vehicle charger establish a conductive connection with the one or more electric vehicles to conductively charge the one or more electric vehicles. As an alternative, the method may further comprise having the mobile electric vehicle charger establish an inductive connection with the one or more electric vehicles to inductively charge the one or more electric vehicles.

According to one embodiment of the present invention, the method further comprises having the mobile electric vehicle charger transmit data indicating the charging status of the one or more electric vehicles to a data network. Examples of transmitted data indicating the charging status may include, but is not limited to, whether charging has started, estimates of the amount of charging, estimates for completion of charging, whether charging can be accomplished, completion of charging, or combinations thereof. According to another embodiment of the present invention, the method further includes having the mobile electric vehicle charger transmit data to a wireless network indicating the location of the electric vehicle charger. The method may also comprise generating an electronic map image showing the location of the electric vehicle charger and/or the charging status of the electric vehicle being charged. The method also comprises providing the image with charging status to one or more information or communication devices connected to the data network. Optionally, the method may include providing the locations of all of the electric vehicles in the parking area for which a charging request has been received. According to one embodiment of the present invention, the electronic map image displays location data for the electric vehicle charger, location data for one or more electric vehicles, and the charging status of the one or more electric vehicles in real time.

Another method according to one or more embodiments of the present invention comprises providing a mobile electric vehicle charger to a parking area which receives one or more electric vehicles. The method also includes operating the mobile electric vehicle charger within the parking area to charge the one or more electric vehicles by sequentially moving, i.e. relocating, the mobile electric vehicle charger to within sufficient proximity of the one or more electric vehicles to establish an electrical charging connection.

According to one embodiment of the present invention, the method further comprises using a transport vehicle to move the mobile electric vehicle charger to a position sufficiently proximate to the electric vehicle for charging. The method also includes having the transport vehicle leave the mobile electric vehicle charger to charge the electric vehicle. The method also includes moving the transport vehicle to another location and/or using the transport vehicle to perform other activities while waiting for at least partial completion of the charging of the electric vehicle by the electric vehicle charger before returning the transport vehicle to the mobile electric vehicle to retrieve the mobile electric vehicle charger. The method further includes using the transport vehicle to move the mobile electric vehicle charger to another electric vehicle for charging or to a base station for re-charging the mobile electric vehicle charger or for replacing a power supply of the mobile electric vehicle charger.

According to one or more embodiments of the present invention, the transport vehicle is configured to transport one or more electric vehicle chargers at the same time. More specifically, the transport vehicle and the electric vehicle chargers together form a modular system which enables the one or more electric vehicle chargers to be distributed at the locations of electric vehicles for charging while the transport vehicle is not bound to remain at the location of the electric vehicle chargers during the charging process. This is accomplished by having the electric vehicle chargers detachable from the transport vehicle and re-attachable to the transport vehicle. According to one or more embodiments of the present invention, the electric vehicle chargers moved using a transport vehicle may also include wheels and/or treads so that the mobile electric vehicle chargers can be easily moved to and from the transport vehicle and/or placed closer to the electric vehicle to be charged. According to one or more embodiments of the present invention, the transport vehicle moves the one or more electric vehicle chargers by pushing, pulling, or carrying the one or more electric vehicle chargers.

According to one or more embodiments of the present invention, a transport vehicle may be used as part of a system such as the system described above and illustrated in FIG. 9. More specifically the transport vehicle may be used to move or relocate mobile electric vehicle chargers 190 to locations close to electric vehicles 310. The use of transport vehicles to move mobile electric vehicle chargers further enables the use of mobile electric vehicle chargers which may not be motorized and/or may not be capable of propelling itself.

Figure 10:
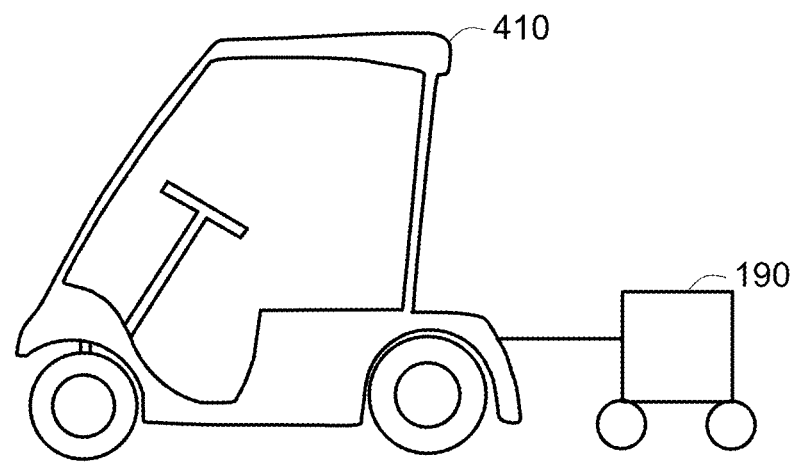
FIG. 10 is a diagram of a transport vehicle moving an electric vehicle charger according to one or more embodiments of the present invention.
Figure 11:
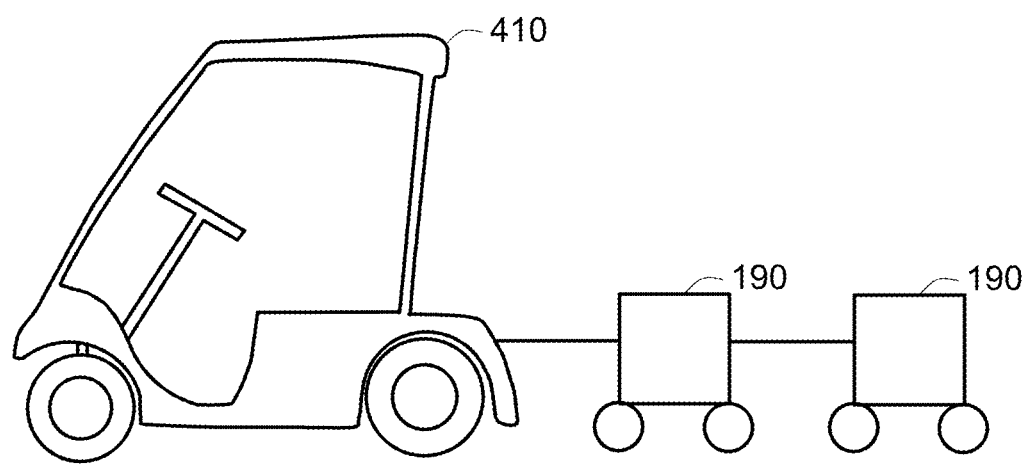
FIG. 11 is a diagram of a transport vehicle moving an electric vehicle charger according to one or more embodiments of the present invention.

Reference is now made to FIG. 10 and FIG. 11 where there are shown example configurations for transport vehicle

Figure 12:
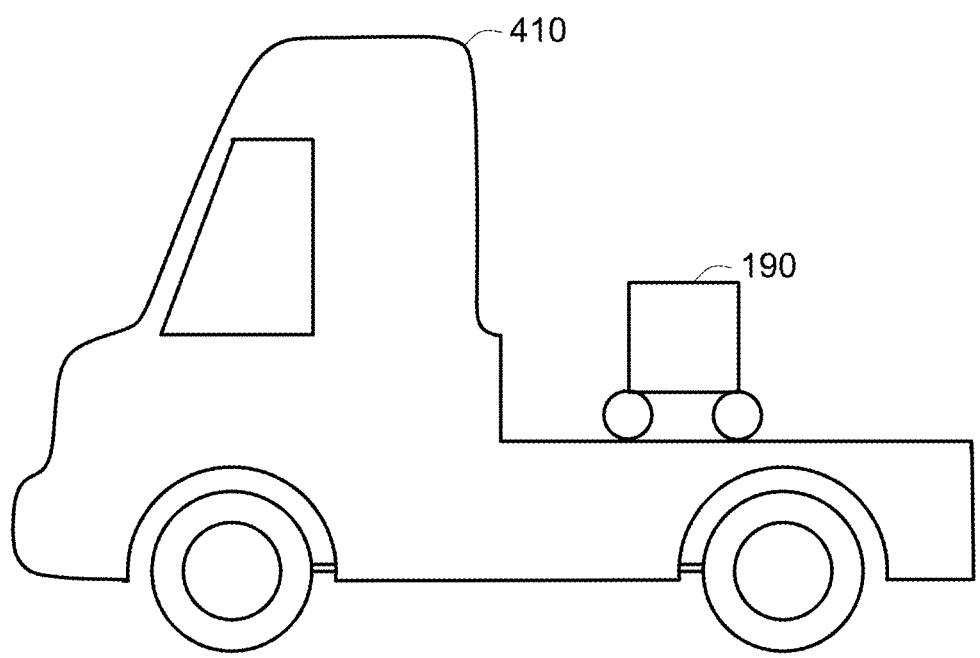
FIG. 12 is a diagram of a transport vehicle moving an electric vehicle charger according to one or more embodiments of the present invention.

410 pulling one mobile electric vehicle charger 190 and pulling two mobile electric vehicle chargers 190, respectively. Transport vehicle 410 may be any type of motorized vehicle, such as but not limited to golf cart and fork lift. FIG. 12 shows an example of another motorized vehicle 410 configured for carrying mobile electric vehicle charger 190.

According to one or more embodiments of the present invention, the mobile electric vehicle charger is not motorized and/or not self propelled. Alternatively, one or more embodiments of the present invention include using a mobile electric vehicle charger that is motorized and/or self propelled. Whether the mobile electric vehicle charger is motorized or not motorized, the sequential moving or relocating can be accomplished by pulling, pushing, and/or carrying the mobile electric vehicle charger. Optionally, the process of sequentially moving or relocating the mobile electric vehicle charger may be accomplished by pulling, pushing, and/or carrying the mobile electric vehicle charger by hand, such as by a person or by a transport vehicle.

Another method according to one or more embodiments of the present invention comprises providing a mobile electric vehicle charger to a parking area which receives one or more electric vehicles. The method also includes operating the mobile electric vehicle charger within the parking area to charge the one or more electric vehicles by sequentially moving, i.e. relocating, the mobile electric vehicle charger to within sufficient proximity of the one or more electric vehicles to establish an electrical charging connection. The method further comprises billing an owner or a renter of the parking area a fee for having the mobile electric vehicle charger available to charge the electric vehicles. Alternatively, the method further comprises billing an owner or a renter of the parking area a fee for having the mobile electric vehicle charger available to charge the electric vehicles and having an attendant present for managing the mobile electric vehicle charger. Optionally, the method may comprise billing an owner or a renter of the parking area an hourly, a daily, a weekly, a monthly, a yearly, or a multi-yearly fee for having the mobile electric vehicle charger available to charge the electric vehicles. As another option, the method further comprises billing an owner or a renter of the parking area an hourly, a daily, a weekly, a monthly, a yearly, or a multi-yearly fee for having the mobile electric vehicle charger available to charge the electric vehicles and having an attendant available to maintain the mobile electric vehicle charger.

Figure 13:
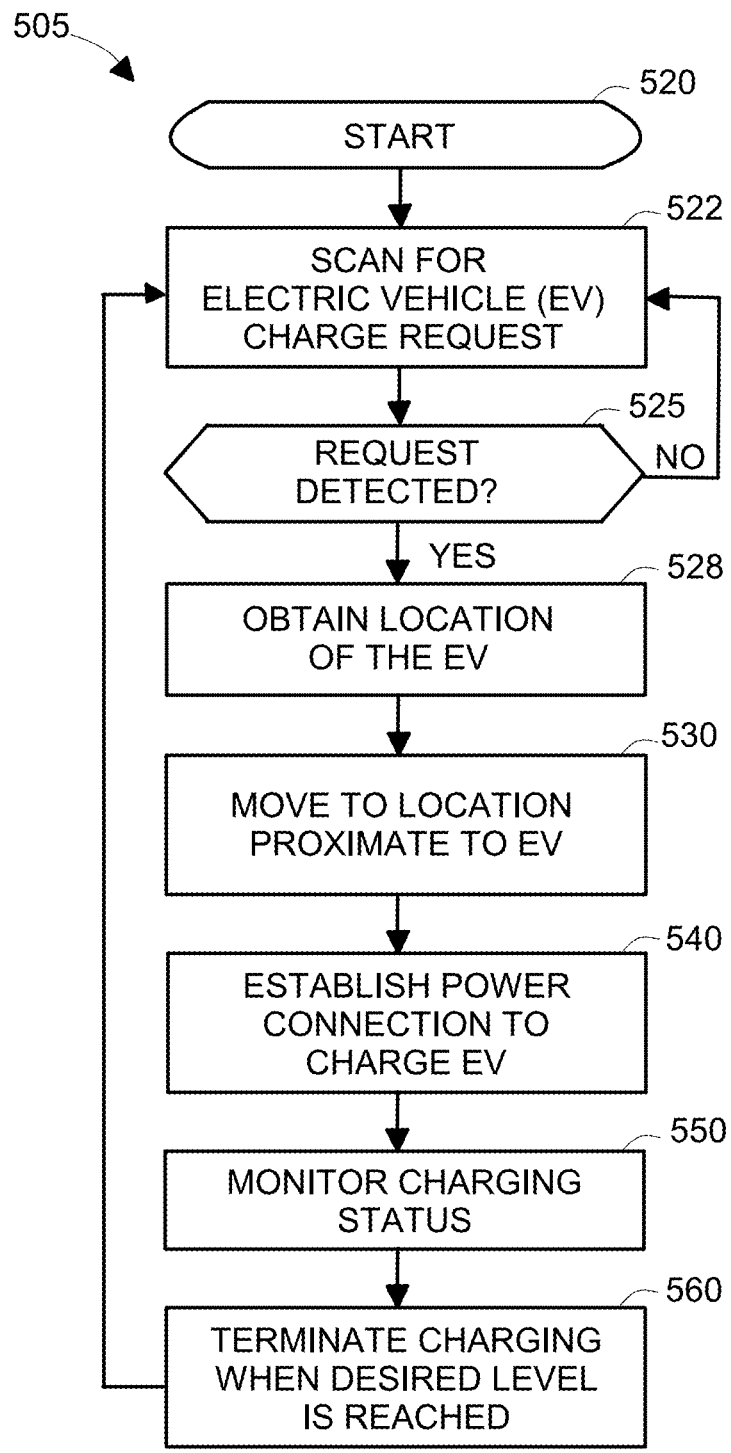
FIG. 13 is a diagram of a process flow according to one or more embodiments of the present invention.

Reference is now made to FIG. 13 where there is shown a process flow 505 according to one or more embodiments of the present invention for providing electric vehicle charging to electric vehicles located in a parking area. The process flow 505 includes process 520 which represents the start of the process flow. Process 520 is followed by process 522. Process 522 involves determining or acquiring information about whether there are electric vehicles in the parking area to be charged. Process 522 may include, but is not limited to, scanning for electric vehicle charging requests, receiving instructions to charge an electric vehicle, and detecting the presence of an electric vehicle for charging. The request for electric vehicle charging may include, but is not limited to, a request by an electric vehicle driver, a request by an attendant, or a prearranged request for electric vehicle charging such as on a periodic basis. Optionally the request for electric vehicle charging may be obtained by wireless communication such as through a data network or by way of a wireless signal.

Process flow 505 also includes process 525. Process 525 is a decision process which either returns to process 522 if there are no requests for charging or proceeds to process 528 if there is an electric vehicle for charging. Process 528 includes obtaining the location of the electric vehicle to be charged. Process 528 may include, but is not limited to, receiving location information such as coordinates for the electric vehicle or other location identification information. Process 528 may include, but is not limited to, one or more processes, machine executable instructions, computer programs, computer program products, communications, and/or hardware described above to obtain the location of the electric vehicle to be charged. The location information may be obtained from an information database containing the locations at which electric vehicles are parked, the location information may be provided by a driver of the electric vehicle to be charged, or an attendant for the electric vehicle to be charged, or an attendant for the electric vehicle charger.

Process flow 505 includes process 530 which according to one or more embodiments of the present invention follows process 528. Process 530 pertains to moving the electric vehicle charger to the electric vehicle to be charged so as to accomplish electric vehicle charging. Process 530 may include, but is not limited to, one or more processes, machine executable instructions, computer programs, computer program products, communications, and/or hardware described above to accomplish getting the electric vehicle charger close enough to the electric vehicle to effect electric vehicle charging.

Process flow 505 also includes process 540 which pertains to establishing a power connection to accomplished electric vehicle charging. Process 540 may include, but is not limited to, one or more processes, machine executable instructions, computer programs, computer program products, communications, and/or hardware described above to accomplish establishing the power connection between the electric vehicle charger and the electric vehicle to effect electric vehicle charging.

Process flow 505 also includes process 550. Process 550 pertains to monitoring the charging status of the electric vehicle charger to the electric vehicle to be charged and/or status of the electric vehicle charger power supply during the electric vehicle charging. Process 550 may include, but is not limited to, one or more processes, machine executable instructions, computer programs, computer program products, communications, and/or hardware described above to accomplish collection of information about the charging of the electric vehicle and the power supply of electric vehicle charger. According to one or more embodiments of the present invention, process 550 may include collecting data and transmitting the data to a data network and/or to an information and/or communication device so that the information can be provided to the driver of the electric vehicle, the attendant for the electric vehicle, the attendant for the electric vehicle charger, or combinations thereof.

Process flow 505 also includes process 560. Process 560 pertains to termination of the charging of electric vehicle by the electric vehicle charger. Process 560 may include, but is not limited to, one or more processes, machine executable instructions, computer programs, computer program products, communications, and/or hardware described above to accomplish termination of the charging process and disconnecting and/or decoupling the electric vehicle charger from the electric vehicle. According to one or more embodiments of the present invention, process 560 may include issuing a signal and/or transmitting a message that the charging is complete to a data network and/or to an information and/or communication device so that the signal or message is provided to the driver of the electric vehicle, the attendant for the electric vehicle, the attendant for the electric vehicle charger, or combinations thereof. Optionally, the charging may be performed to a desired level such as to the point of substantially fully charging the electric vehicle or partially charging the electric vehicle.

Figure 14:
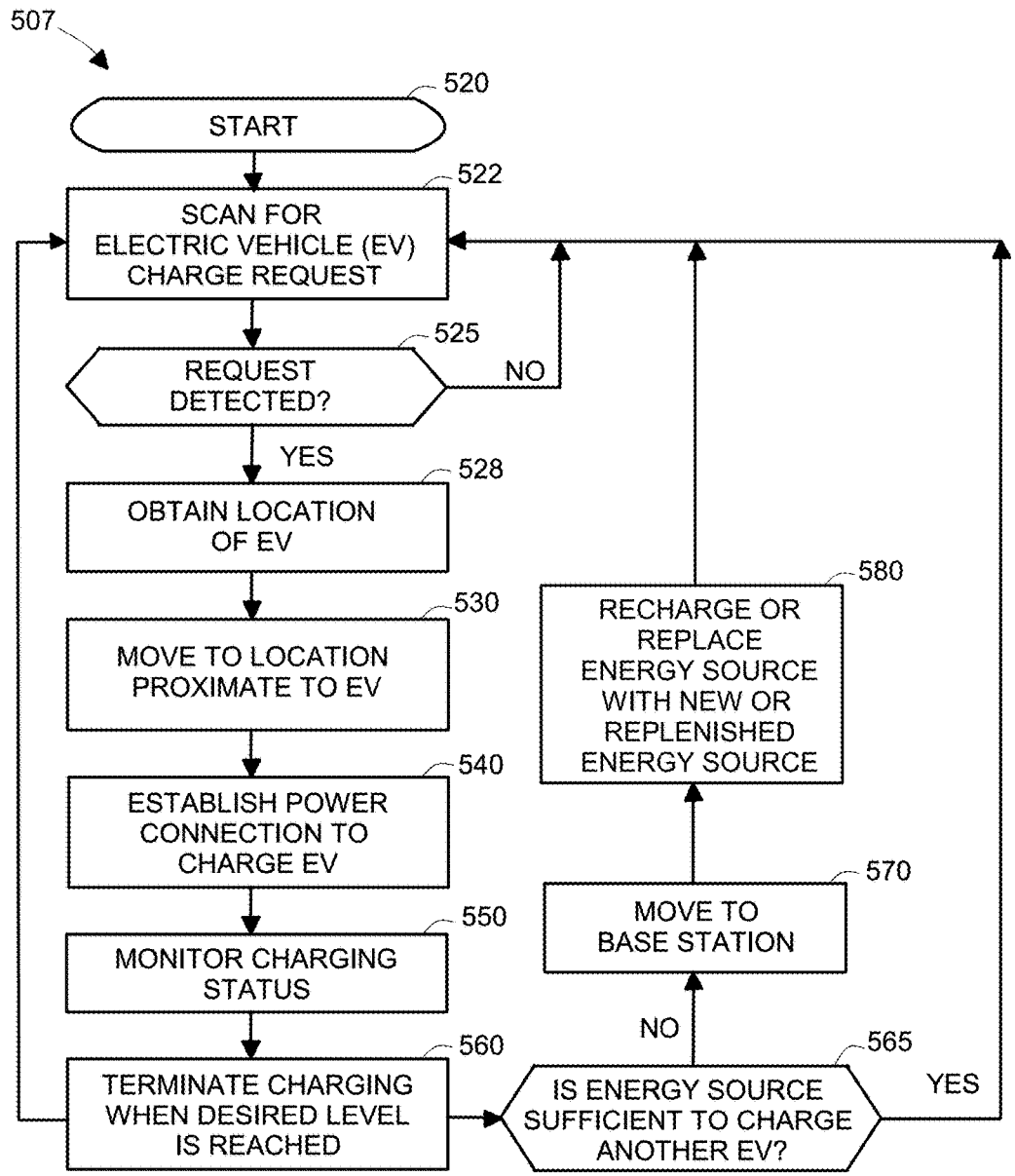
FIG. 14 is a diagram of a process flow according to one or more embodiments of the present invention.

Reference is now made to FIG. 14 where there is shown process flow 507 according to one or more embodiments of the present invention. Process flow 507 is essentially the same as process flow 505 in that it includes processes 520, 522, 525, 528, 530, 540, 558, and 560 substantially as described for process flow 505. Process flow 507 further comprises process 565. Process 565 is a decision process related to whether the electric vehicle charger has enough energy in its power supply to charge another electric vehicle. If there is sufficient energy in the mobile electric vehicle charger to charge another electric vehicle, then process flow 507 returns to process 522. If the energy level of the mobile electric vehicle charger is not sufficient to charge another electric vehicle, then process flow 507 goes to process 570.

Process 570 pertains to moving the mobile electric vehicle charger to a base station for replacing or recharging the mobile electric vehicle charger power supply. Process flow 507 includes process 580 which pertains to replenishing the energy stored of the mobile electric vehicle charger. According to one or more embodiments of the present invention, the electric power supply of the mobile electric vehicle charger is recharged such as by connecting it with the electric grid or another supply of electric power. According to one or more other embodiments of the present invention, the electric power supply of the mobile electric vehicle charger is replaced with a recharged electric power supply and the depleted electric power supply is recharged at the base station while separated from the mobile electric vehicle charger.

Another embodiment of the present invention is a method performed on an electric vehicle having an induction power coupling receiver disposed on the underside of the electric vehicle. The method comprises providing a motorized electric vehicle charger. The mobile electric vehicle charger comprises an electric power supply and an induction power coupling transmitter connected with the electric power supply to inductively transfer electric energy derived from the electric power supply to the induction power coupling receiver. The motorized electric vehicle charger further comprises a motorized cart having the electric power supply mounted thereon for movement of the electric power supply and a control and communication system connected with the motorized cart so that the mobile electric vehicle charger can move in response to signals from the control and communication system. The method further includes having the control and communication system provide signals to the motorized cart to align the induction power coupling transmitter with the induction power coupling receiver to accomplish inductive transmission of electric energy from the electric power supply to the electric vehicle. In other words, the mobile electric vehicle charger repositions itself, i.e. makes adjustments to its location, through movements controlled by the control and communication system so that the transmitting coil and receiving coil are aligned for inductive energy transfer.

According to one or more embodiments of the present invention, the mobile electric vehicle charger is sized so that the mobile electric vehicle charger fits between a surface supporting the electric vehicle and the under carriage of the electric vehicle. As an option for one or more embodiments of the present invention, the mobile electric vehicle charger is sized so that at least a portion of the mobile electric vehicle charger fits between a surface supporting the electric vehicle and the under carriage of the electric vehicle.

According to another embodiment of the present invention, the mobile electric vehicle charger makes adjustments to its location to align its power coupling transmitter with the power coupling receiver of the electric vehicle. The method further includes having the mobile electric vehicle charger move the power coupling transmitter up toward the power coupling receiver to reduce the gap spacing between the electric vehicle charger power coupling transmitter and the power coupling receiver of the electric vehicle.

In the foregoing specification, the invention has been described with reference to specific embodiments; however, one of ordinary skill in the art appreciates that various modifications and changes can be made without departing from the scope of the present invention as set forth in the claims below. Accordingly, the specification is to be regarded in an illustrative, rather than a restrictive sense, and all such modifications are intended to be included within the scope of the present invention.

Benefits, other advantages, and solutions to problems have been described above with regard to specific embodiments; however, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having," "at least one of," or any other variation thereof, are intended to cover a non-exclusive inclusion. For example, a process, method, article, or apparatus that comprises a list of elements is not necessarily limited only to those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A method comprising:
providing a mobile electric vehicle charger to a parking area which receives one or more electric vehicles;
operating the mobile electric vehicle charger under autonomous or remote control to charge the one or more electric vehicles by sequentially moving the mobile electric vehicle charger to within sufficient proximity of the one or more electric vehicles to establish an electric charging connection;
having the mobile electric vehicle charger transmit data to a wireless network indicating the location of the mobile electric vehicle charger; and
providing a base station within or proximate to the parking area for replacing a depleted power supply on the mobile electric vehicle charger with a recharged power supply.

2. The method of claim 1, further comprising having the mobile electric vehicle charger establish a conductive connection with the one or more electric vehicles to conductively charge the one or more electric vehicles.

3. The method of claim 1, further comprising having the mobile electric vehicle charger establish an inductive connection with the one or more electric vehicles to inductively charge the one or more electric vehicles.

4. The method of claim 1, further comprising having the mobile electric vehicle charger transmit data to a wireless network indicating the status of charging the one or more electric vehicles.

5. The method of claim 1, further comprising having the mobile electric vehicle charger transmit data to a wireless network indicating the location of the mobile electric vehicle charger and generating an electronic map image showing the location of the mobile electric vehicle charger.

6. The method of claim 1, further comprising having the mobile electric vehicle charger transmit data to a wireless network indicating a charging status of the one or more electric vehicles and generating an electronic map image showing the location of the mobile electric vehicle charger and the charging status of the electric vehicle.

7. The method of claim 1, further comprising billing an owner or a renter of the parking area a fee for having the mobile electric charger available to charge the one or more electric vehicles.

8. The method of claim 1, further comprising billing an owner or a renter of the parking area an hourly, a daily, a weekly, a monthly, a yearly, or a multi-yearly fee for having the mobile electric vehicle charger available to charge the one or more electric vehicles.

9. A method performed on an electric vehicle having an induction power coupling receiver disposed on the underside of the electric vehicle, the method comprising:
   providing a mobile electric vehicle charger, the mobile electric vehicle charger comprising an electric power supply, an induction power coupling transmitter connected with the electric power supply to inductively transfer electric energy derived from the electric power supply to the induction power coupling receiver, a motorized cart having the electric power supply mounted thereon for movement of the electric power supply and the induction power coupling transmitter, a control and communication system connected with the motorized cart so that the mobile electric vehicle charger can move in response to signals from the control and communication system;
   having the control and communication system provide signals to the motorized cart to align the induction power coupling transmitter with the induction power coupling receiver to accomplish inductive transmission of electric energy from the electric power supply to the electric vehicle.

10. A method according to claim 9, wherein the mobile electric vehicle charger is sized so that the mobile electric vehicle charger fits between a surface supporting the electric vehicle and the under carriage of the electric vehicle.

11. A method according to claim 9, wherein the mobile electric vehicle charger is sized so that at least a portion of the mobile electric vehicle charger fits between a surface supporting the electric vehicle and the under carriage of the electric vehicle.

12. A method according to claim 9, wherein the mobile electric vehicle charger makes adjustments to its location to align induction power coupling transmitter with induction power coupling receiver of the electric vehicle.

13. A method according to claim 9, wherein the mobile electric vehicle charger makes adjustments to its location to align the induction power coupling transmitter with the induction power coupling receiver of the electric vehicle and moves the power coupling element to reduce the gap spacing between the induction power coupling transmitter and the induction power coupling receiver of the electric vehicle.

* * * * *